US010685667B1

(12) United States Patent
Stefanakis et al.

(10) Patent No.: US 10,685,667 B1
(45) Date of Patent: Jun. 16, 2020

(54) MEDIA CONTENT MIXING APPARATUSES, METHODS AND SYSTEMS

(71) Applicant: Foundation for Research and Technology—Hellas (FORTH), Heraklion (GR)

(72) Inventors: Nikolaos Stefanakis, Heraklion (GR); Athanasios Mouchtaris, Heraklion (GR)

(73) Assignee: FOUNDATION FOR RESEARCH AND TECHNOLOGY—HELLAS (FORTH), Heraklion (GR)

( * ) Notice: Subject to any disclaimer, the term of this patent is extended or adjusted under 35 U.S.C. 154(b) by 0 days.

(21) Appl. No.: 16/006,575

(22) Filed: Jun. 12, 2018

Related U.S. Application Data

(63) Continuation of application No. 16/004,117, filed on Jun. 8, 2018.
(Continued)

(51) Int. Cl.
 *G10L 21/00* (2013.01)
 *G10L 21/055* (2013.01)
 *H04N 5/04* (2006.01)

(52) U.S. Cl.
 CPC .......... *G10L 21/055* (2013.01); *H04N 5/04* (2013.01)

(58) Field of Classification Search
 CPC ... G10L 21/0208; G10L 25/06; G10L 19/008; G10L 21/055; G11B 27/10; H04M 3/568
(Continued)

(56) References Cited

U.S. PATENT DOCUMENTS

| 7,461,002 B2 * | 12/2008 | Crockett ................. 704/278 |
| 2007/0014422 A1 * | 1/2007 | Wesemann ........... H04H 60/04 |
| | | 381/119 |

(Continued)

FOREIGN PATENT DOCUMENTS

WO  WO-2004015688 A1 *  2/2004  ............ G10L 21/04

OTHER PUBLICATIONS

Kennedy L. et al., "Less talk, more rock: Automated organization of community-contributed collections of concert videos," In Proceedings of the 18$^{th}$ International Conference on World Wide Web, pp. 311-320, 2009.
(Continued)

Primary Examiner — Md S Elahee
(74) Attorney, Agent, or Firm — Norton Rose Fulbright US LLP

(57) ABSTRACT

In aspects, systems, methods, apparatuses and computer-readable storage media implementing embodiments for mixing audio content based on a plurality of user generated recordings (UGRs) are disclosed. In embodiments, the mixing comprises: receiving a plurality of UGRs, each UGR of the plurality of UGRs comprising at least audio content; determining a correlation between samples of audio content associated with at least two UGRs of the plurality of UGRs; generating one or more clusters comprising samples of the audio content identified as having a relationship based on the determined correlations; synchronizing, for each of the one or more clusters, the samples of the audio content to produce synchronized audio content for each of the one or more clusters, normalizing, for each of the one or more clusters, the synchronized audio content to produce normalized audio content; and mixing, for each of the one or more clusters, the normalized audio content.

19 Claims, 5 Drawing Sheets

Related U.S. Application Data

(60) Provisional application No. 62/517,004, filed on Jun. 8, 2017.

(58) Field of Classification Search
USPC ............ 704/207, 277, 278, 500; 379/90.01; 725/116; 381/119, 307
See application file for complete search history.

(56) References Cited

U.S. PATENT DOCUMENTS

| | | | | |
|---|---|---|---|---|
| 2008/0232617 | A1* | 9/2008 | Goodwin | G10L 19/008 381/307 |
| 2014/0282796 | A1* | 9/2014 | Walker | H04N 21/4622 725/116 |
| 2015/0310870 | A1* | 10/2015 | Vouin | G11B 27/28 704/500 |

OTHER PUBLICATIONS

Cotton, C. et al., "Audio fingerprinting to identify multiple videos of an event," In Proceedings of the IEEE International Conference on Acoustics, Speech, and Signal Processing (ICASSP), pp. 2386-2389, 2010.

Bano, S. et al., "Discovery and organization of multi-camera user-generated videos of the same event," Journal of Information Sciences, vol. 302, pp. 108-121, 2015.

Bryan, J. et al., "Clustering and synchronizing multi-camera video via landmark cross-correlation," In Proceedings of the IEEE International Conference on Acoustics, Speech, and Signal Processing (ICASSP), pp. 2389-2392, 2012.

Kammerl, J. et al., "Temporal synchronization of multiple audio signals," In Proceedings of the IEEE International Conference on Acoustics, Speech, and Signal Processing (ICASSP), pp. 4603-4607, 2014.

Stefanakis, N. et al., Automatic matching and synchronization of user generated videos from a large scale sport event, In Proceedings of the Kim, M. et al., Collaborative audio enhancement: Crowdsourced audio recording, In Proceedings of the IEEE International Conference on Acoustics, Speech, and Signal Processing (ICASSP), 2017.

Kim, M. et al., Collaborative audio enhancement: Crowdsourced audio recording, In Proceedings of the IEEE International Conference on Acoustics, Speech, and Signal Processing (ICASSP), pp. 41-45, 2016.

* cited by examiner

700

710 Receive a plurality of user generated recordings (UGRs)

720 Determine a correlation between samples of audio content associated with at least two UGRs of the plurality of UGRs

730 Generate one or more clusters comprising samples of the audio content identified as having a relationship

740 Synchronize, for each of the one or more clusters, the samples of the audio content to produce synchronization data for each of the one or more clusters

750 Normalize the synchronized audio content for each of the one or more clusters to produce normalized audio content

760 Mix the normalized audio content for each of the one or more clusters based at least in part on the synchronization data

FIG. 7

MEDIA CONTENT MIXING APPARATUSES, METHODS AND SYSTEMS

CROSS-REFERENCE TO RELATED APPLICATIONS

The present application is a continuation of U.S. patent application Ser. No. 16/004,117 entitled, "MEDIA CONTENT MIXING APPARATUSES, METHODS, AND SYSTEMS," filed Jun. 8, 2018, which claims the benefit of U.S. Provisional Patent Application No. 62/517,004 entitled, "AUDIO SAMPLE MIXING APPARATUSES, METHODS, AND SYSTEMS," filed Jun. 8, 2017, the disclosures of which are expressly incorporated by reference herein in their entirety.

GOVERNMENT FUNDED RESEARCH

The project leading to this application has received funding from the European Union's Horizon 2020 Research and Innovation Programme under Grant Agreement No. 687605.

TECHNICAL FIELD

The present subject matter is directed generally to apparatuses, methods, and systems for acoustic signal processing, and more particularly, to AUDIO SAMPLE MIXING APPARATUSES, METHODS, AND SYSTEMS.

BACKGROUND

With the proliferation of portable multimedia devices, drones, and smartphones, devices capable of capturing every moment of their respective users' lives and the events they attend, such as concerts, sporting events, family celebrations, and the like, have become widespread. Audiovisual recordings from these devices, produced by users attending the same event, may become available through the social media platforms and other media outlets where the users may submit/publish their video and audio content. The availability of such massive amounts of User Generated Recordings (UGRs) has triggered new research directions related to the search, organization, and management of tins content, and has provided inspiration for new business models for content storage, retrieval, and consumption.

SUMMARY

The present disclosure is directed to systems, methods, and computer-readable storage media that facilitate new techniques for organizing, managing, and utilizing UGRs. More specifically, embodiments of the present disclosure provide various techniques for utilizing available UGR content to create new media content. For example, given a collection of UGRs, which may include audio content, video content, audio and video content, and the like, several approaches have been proposed about how to exploit the available visual and audio content—as well as several types of metadata—in order to identify video clips associated to the same moment of the captured event and to synchronize them along the same temporal axis. The audio content is a key to solving this problem and several works have shown that the relations between different UGRs can be revealed by exploiting the correlations in their associated audio streams. An emerging research challenge is to investigate different means by which this low-quality but organized content can be synergistically processed and combined, so as to produce a new audiovisual sequence which provides an improved experience of the captured event. The potential is particularly interesting with respect to the audio modality, as a multitude of synchronized audio recordings essentially provides a multichannel acoustic representation of the event. By combining the different sources of content, it is possible to construct a new audio stream with improved properties in comparison to each one of its constituent parts. However, several preparation steps are required before reaching to the point that the different sources of content can be mixed.

In this application we present several technological advancements related to processing of UGC and particularly audio and video recordings. They are all displayed in FIG. 1. We start by presenting an approach to estimate the match-strength and the temporal offset between two video or audio recordings which is applicable regardless of what type of audio or visual features are used, as long as these features are extracted at regular time intervals. Based on all pairwise relations involving a collection of UGRs, we then propose a methodology for separating the recordings into clusters and then for synchronizing all members of each cluster along the same time-axis. This operation is very important as it allows for synchronous playback of the content, regardless if this concerns the audio or the visual component in the video streams. We then define an iterative normalization process to modify the signal levels of the audio recordings, a step that may significantly improve the outcome of audio mixing. Finally, we present four different audio mixing techniques which are applicable on any type of content (audio or video). We note that each contribution is independent to the other and does not depend on the approach followed in the previous step. For example, our hierarchical clustering approach does not depend on the type of similarity measure used in order to assess the relations between UGRs and each mixing approach is applicable irrespective of what approach was used for synchronizing or normalizing the audio recordings, if any such approach was used.

The foregoing has outlined rather broadly the features and technical advantages of the present disclosure in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of embodiments described herein, both as to its organization and method of operation, together with further objects and advantages will be better understood from the following written description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The accompanying drawings illustrate various non-limiting, example, inventive aspects of audio sampling apparatuses, methods, and systems.

FIG. 7 is a flow diagram of a method for mixing a plurality of UGRs in accordance with embodiments of the present disclosure.

It should be appreciated by those skilled in the art that any block diagrams herein represent conceptual views of illustrative systems. Similarly, it should be appreciated that any flow charts, flow diagrams, state transition diagrams, pseudo code, and the like represent various processes, which may be substantially represented in a computer readable medium and executed by a computer or processor, whether or not such computer or processor is explicitly shown.

DETAILED DESCRIPTION

An emerging research challenge relates to investigating ways in which low-quality but organized media content recordings, such as UGRs, may be synergistically processed and combined to produce a new media content sequence. The potential is particularly interesting with respect to the audio modality, as a multitude of synchronized UGRs may be utilized to generate a multichannel recording of an acoustic event. For example, by combining different sources of content (e.g., different UGRs), a new audio stream may be constructed with improved properties in comparison to each one of its constituent parts. Several preparation steps may be utilized to prepare these different sources of content for mixing. In the description that follows, several approaches for exploiting UGR content (e.g., visual content, audio content, and metadata) to identify portions of a set of UGRs that are associated with or relate to the same moment or portion of a captured event are disclosed. In accordance with the embodiments disclosed herein, similarities between content of different UGRs may be utilized to identify relationships between different UGRs and may also facilitate estimation of an overlap between contents of the UGRs. This information may be utilized to synchronize various UGRs along the same temporal axis, such that the synchronized UGRs may be combined to create new sequences of media content, as described in more detail below. In aspects, the term UGR may refer to recordings of audio content. However, it is noted that UGRs processed according to embodiments of the present disclosure may also contain visual content (e.g., image and/or video content). In aspects, each recording or UGR utilized to create mixed content may have an equal contribution to the produced mixed content.

Figure 1:
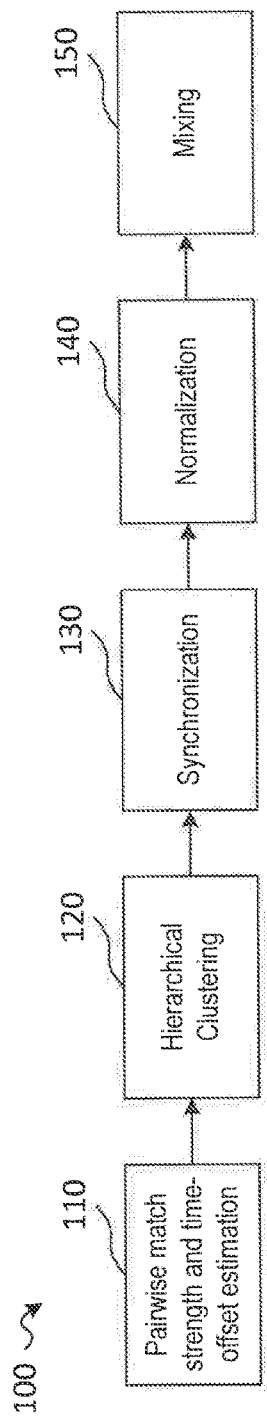
FIG. 1 is a flow diagram illustrating exemplary aspects of a method for mixing a plurality of UGRs according to embodiments of the present disclosure.

Referring to FIG. 1, a flow diagram illustrating exemplary aspects of a process for generating media content by mixing a plurality of UGRs according to embodiments of the present disclosure is shown as a method 100. As shown in FIG. 1, the method 100 includes a first step 110 where a pairwise relation is determined for a collection of UGRs. In aspects, the collection of UGRs may include UGRs from unknown space and time. The method 100 also includes a second step 120, where the UGRs may be separated into groups or clusters. In aspects, each cluster of UGRs may be relevant to a particular event or a part of the particular event. After clustering has been completed, the method 100 includes a third step 130 where UGRs in the same group or cluster may be synchronized along a time-axis. In aspects, the time-axis may be a unique time-axis. In a fourth step 140, the synchronized UGRs may be normalized, and in a fifth step of the method 100, the UGRs may be mixed based on the synchronization to produce new media content, which may include audio content, video content, or both audio content and video content.

Exemplary aspects of each of the steps 110-150 of the method 100 are described in more detail below. In aspects, a fingerprinting algorithm for calculating the pairwise relations between UGRs and an approach for clustering UGRs based on various types of pairwise similarity measures between the UGRs are disclosed. Additionally, a methodology for synchronizing UGRs belonging to the same cluster along a same time-axis and an iterative normalization process are also disclosed. Further, a plurality of different mixing techniques are disclosed that exploit a multiplicity of matched, synchronized and normalized UGRs in order to reproduce a new audio stream which combines acoustic information available in the overlapping UGRs at each point in time. In aspects, the hierarchical clustering (e.g., in the second step 120) approach may not depend on the type of similarity measure used in order to express the relations between UGRs (e.g., in first step 110), and each mixing (e.g., in the fifth step 150) approach may be applicable irrespective of the normalization (e.g., in the fourth step 140) approach employed for normalizing the audio clips.

As briefly described above, a pairwise match strength and time-offset estimation may be performed at step 110. As a result of step 110, information that provides an indication of the similarity between different pairs of UGRs and timing information may be generated. For example, consider a collection of M UGRs in a particular format (e.g., a pulse-code modulation (PCM) format) such that vectors $x_m$, m= 1, . . . , M contain sampled values of each UGR. In aspects, the UGRs may be sampled at a common sampling rate ($F_s$). A similarity measure $R_{ij}$ between any pair of different UGRs i and j may be estimated as follows. First, for each audio file, an $N_m \times 1$ audio fingerprint vector ($F_m$) may be constructed and stored in a memory, where $N_m$ is the number of time-frames used in the analysis of the $m^{th}$ recording (and thus depends on the duration of that recording). Second for each pair ij, a vector containing the values of a generalized cross-correlation function denoted as $R_{F_i F_j}(\tau)$ may be calculated, where $\tau \in \mathbb{Z}$ spans all possible time-frame offsets between fingerprints i and j. Finally, the maximum of the cross correlation, which may be given by:

$$R_{ij} = \max_{\tau} R_{F_i F_j}(\tau) \quad (1)$$

which may be utilized as the similarity measure between recordings i and j. As a side product of this process, time-frame difference of arrivals $\tau_{ij}$=arg max $R_{F_i F_j}(\tau)$ may be derived, which may be used to synchronize recordings i and j. In aspects, the time-frame difference of arrivals may be stored in a memory as an M×M matrix T such that $T_{ij}=\hat{\tau}_{ij}$ and $T_{ji}=-\hat{\tau}_{ij}$.

The above-identified process does not depend on the particular types of fingerprints used for each of the UGRs. In aspects, a method for constructing a fingerprint vector may take into account energy variations in a single frequency region. For the fingerprint extraction process, an auxiliary signal may be defined, which may be given by:

$$P_m[n] = \sum_{\tau=n-L}^{n+L} \sum_{\omega=k_{LB}}^{k_{UB}} |X_m(\tau, \omega)| \quad (2)$$

where $|X_m(\tau,\omega)|$ is the short-time Fourier transform (STFT) coefficient associated with the $\tau^{th}$ time-frame and $\omega^{th}$ frequency bin of the audio signal at recording m, $k_{LB}$ and $k_{UB}$ are the frequency indexes corresponding to lower and upper frequency limit respectively, and L is a positive integer used for time averaging. The sub-fingerprint at time n is scalar defined as:

$$F_m[n] = \begin{cases} 1 & \text{if } P_m(n) \geq P_m(n-1) \\ -1 & \text{if } P_m(n) < P_m(n-1) \end{cases} \quad (3)$$

In aspects, the fingerprint vector $F_m$ may be a vector with values equal to 1 or −1.

With respect to the hierarchical clustering of UGRs at step 120, consider a collection of M UGRs $x_m$, m=1, . . . , M. Let M×M matrix R denote a matrix containing a measure of all pairwise similarities between UGRs (i.e., $R_{ij}$=similarity ($x_i$, $x_j$)∈ℝ +) where the similarity measure may be obtained using, for example, audio signal cross-correlation, or fingerprint cross-correlation, such as the technique defined above with reference to Equation (2).

From matrix R, another M×M distance matrix D may be constructed such that:

$$D_{ij} = \frac{1}{R_{ij}} \quad (4)$$

Matrix R may provide information about pairwise relations between UGRs, but a higher level or organization for the collection may be beneficial so that recordings originating from the same part of the event (e.g., a particular song in a concert) may be grouped into a single cluster. Below, an exemplary three step process to determine both a number of clusters as well as the members of each cluster is described:

(1) Assuming the each UGR represents an observation and that $D_{ij}$, ∀i,j:i≠j represents the distance between observations i and j, obtain an agglomerative hierarchical cluster tree linking all M UGRs using a single-linkage hierarchical clustering method. In aspects, Matlab's function linkage may be used.

(2) The number of clusters and the identities of the UGRs in each cluster may be estimated by setting a threshold $D_{max}$ and requesting that the distance that a UGR should exhibit before entering a particular cluster is smaller than $D_{max}$.

(3) A graph consisting of M nodes may be constructed so that the $m^{th}$ node corresponds to the $m^{th}$ UGR and so that initially, no node is connected to another node. Based on the results of hierarchical clustering, only those nodes which are directly linked in the cluster tree describing the linkage between the UGRs from step (1) may be connected in the graph. In aspects, two variations concerning the weights given to the edge connecting two nodes in the graph may exist. In aspects, these weight variations may indicate that the weight between connected nodes is always equal to 1, or that the weight between connected nodes t and j is equal to their distance $D_{ij}$.

In the exemplary operations of step 130 for synchronization of UGRs described below, it may be assumed that a collection of M'≥2 UGRs assigned to the same cluster based on the approach described above (e.g., based on operations described above with respect to steps 110 and 120) is identified. Based on step 3 of the second step 120 described above, these M' UGRs may form a graph with M' nodes and M'−1 edges. A clip indexed with m' may be assigned as a reference clip for this collection. In aspects, m' may be the index of any of the two nodes exhibiting the smallest distance $D_{ij}$ (i.e., the two UGRs exhibiting the strongest similarity value). For this collection of UGRs, let T be an M'×M' matrix with an initial synchronization time-frame offset, such that $T_{ij}$ is a time-frame offset maximizing the cross-correlation between clips t and j, or the time-frame offset which maximizes the cross-correlation between fingerprints associated to clips i and j (this information may be derived based on the analysis of step 110). In aspects, $T_{ij}=-T_{ij}$ holds. In aspects, the time-frame offsets in matrix T might be incorrect. In aspects, this may be caused by, for example, weak cross-correlation between two audio streams, or due to the fact that two UGRs, although in the same cluster, do not temporally overlap at all. Based on the graph constructed in the second step 120, let set p(i→m') denote the shortest path connecting node i with reference node m'. In aspects, this may be calculated by using graph analysis functionality, such as the Matlab function graphshortestpath. Hie new sample offset $Q_{im}$, synchronizing UGR i with UGR m' may be determined by summing together all sample offsets specific to the edges that form the shortest path from t to m'. For example, if m'=5 and the shortest path connecting UGR 1 with UGR 5 is the set {1, 2, 4, 5}, then $Q_{1,5}=T_{1,2}+T_{2,4}+T_{4,5}$. Based on this approach, all M'−1 UGRs in the same cluster may be synchronized with respect to the reference UGR and as a consequence, to one another.

Figure 2:
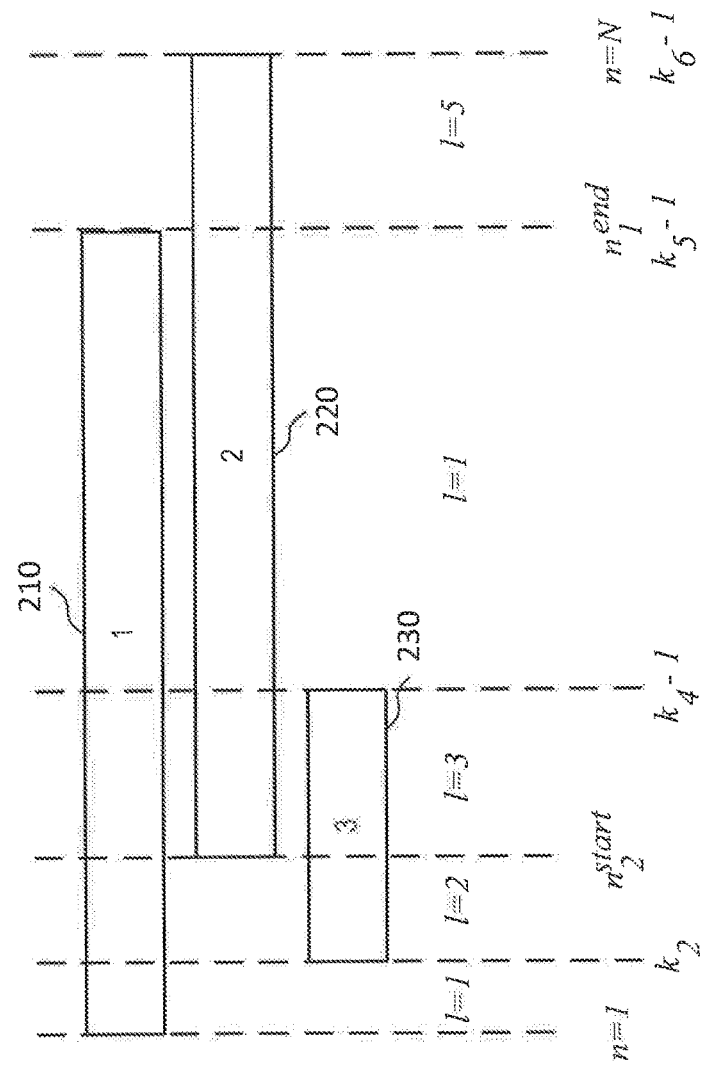
FIG. 2 shows a diagram illustrating aspects of time aligning UGRs along a common time axis.

In an aspect, the normalization process of step 140 may be utilized to improve the quality of media content produced by the mixing step. To illustrate, a collection of M temporally overlapping UGRs sampled at common sampling rate Fs. As users start and stop recording at random time instants, and, therefore, each UGR in the collection M may have a different duration and position on a timeline. After performing synchronization, as described above, it may be assumed that all M recordings are correctly time aligned along a common time axis. Referring briefly to FIG. 2, a diagram illustrating aspects of time aligning UGRs along a common time axis according to embodiments of the present disclosure is shown. In FIG. 2, three mutually overlapping audio recordings defining six transition points and five constant time segments are shown, where time points are indexed with n and time segments with l. In aspects, the time axis may be discretized in terms of a uniform time grid, and each point on the time grid may be indexed by n, as shown in FIG. 2. It is noted that these time points need not correspond to signal samples necessarily, as in practice a sparser discretization than that may be used for sampling the audio signal in some cases, which may reduce computational complexity. Returning now to operations of step 130, let $n_m^{start}$ and $n_m^{end}$ denote the start and end time, respectively, of the $m^{th}$ UGR. Time points $n_m^{start}$ and $n_m^{end}+1$, m=1, . . . M may represent the so-called transition points of the plot (e.g., the locations in time where the number of audio clips participating in the mix changes). Using the notation $\mathbb{U} = \{n_m^{start}, n_m^{(start)}+$ $1, \ldots n_m^{(end)}\}$ to denote the set with the time indexes for which audio clip m contains audio information, it may be assumed in what follows that, for each clip i in the collection, there is at least another clip j, such that $\mathbb{U}_i \cap \mathbb{U}_j \neq \emptyset$. In other words, each UGR overlaps (completely or partly) with at least another UGR in the collection. $\mathbb{U}_m$ may represent the time region where UGR m is active, implying that the $m^{th}$ recording does not contain any audio information at time indexes lower or greater than the minimum and maximum index in $\mathbb{U}_m$, respectively.

By combinatorially processing the available UGRs, it may be possible to construct an audio stream which has larger duration than any of the UGRs individually. Without loss of generality, it may be assumed that an audio sequence produced as a result of combining all the available UGRs will extend from n=1 to n=N, corresponding to the earliest and latest moment of the event, respectively, captured in the M recordings. We also let c be the N×1 positive integer vector indicating the number of clips which are active at each time instant. In this scenario, $1 \le c[n] \le M$, $\forall n$ holds.

Iterative normalization concerns a collection of M UGRs which belong to the same cluster and thus share common content with one another. This normalization has various advantages: it may ensure that all UGRs have equal significance in the mixing process, avoiding, for example, recordings acquired at a small distance from the sound sources to mask those captured at distances further apart. Also, accurate normalization may be important for constructing a mix without discontinuities and audible level transitions, which are expected to occur at the transition point where a clip starts or stops participating in the mixing process. In aspects, a specific energy profile $p_m^{(0)}$ for a UGR may be defined as a non-negative N×1 real vector carrying the energy of the $m^{th}$ clip at each discrete time index (e.g., $p_m^{(0)}=[p_m[1], \ldots, p_m[n], \ldots, p_m[N]]$. For time indexes n which do not belong to the time support of clip m, a zero value may be assigned as follows:

$$p_m^{(0)}[n] = \begin{cases} \text{Energy of } mth \text{ clip at time-point } n & \text{if } n \in \mathbb{U}_m \\ 0 & \text{otherwise} \end{cases} \quad (5)$$

With respect to the example depicted in FIG. 2, the energy profile of the UGR associated with index m=2 may be all zeros for n=1 until point $n=n_2^{start}-1$, as well as for $n=n_2^{end}+1$ until n=N.

It may now be observed that the total energy of the sound signal in UGR m may be derived as $$E_m = \sum_{n \in \mathbb{U}_m} p_m^{(0)}[n] = \sum_{n=1}^{N} p_m^{(0)}[n].$$

An inverse clip cardinality vector C, which may be an N×1 vector defined as $$C = \left[\frac{1}{c[1]}, \frac{1}{c[2]}, \ldots, \frac{1}{c[n]}\right]^T.$$

The scope of normalization may be to define a scalar $\mu_m$ to weight each original UGR and may be implemented through an iterative process described below in Table 1.

TABLE 1

Algorithm for Iterative Normalization

Input: Initial energy profiles $p_m^{(0)}$, $\forall m$,
Input: Inverse cardinality vector C
Input: number of iterations I
Output: normalization gains $\mu_m$, $\forall m$
for i = 1 to I do $$q^{(i)} = \sum_{m=1}^{M} p_m^{(i-1)}$$

$p^{(i)} = C \cdot q^{(i)}$ ( · implies element-wise multiplication)

for m = 1 to M do $$p_m^{(i)} \leftarrow \lambda_m^{(i)} p_m^{(i-1)}$$

where $\lambda_m^{(i)} = \dfrac{\sum_{n \in \mathbb{O}_m} p^{(i)}[n]}{\sum_{n \in \mathbb{O}_m} p^{(i-1)}[n]}$ end for
end for $$\mu_m = \sqrt{\prod_{i=1}^{i} \lambda_m^{(i)}}$$

Letting now column vector $x_m$ represent the sound signal in audio clip m, this signal can be replaced with its normalized version as:

$$\hat{x}_m = \mu_m x_m \quad (6)$$

a process which is repeated for all m=1, ..., M.

As previously said, the distance between consecutive points on the grid, say $T_n$, might be much larger than the sampling period $T_s=1/F_s$. The energy at point n for clip m can be calculated through the summation $$p_m[n] = \sum_{k=1}^{L} \frac{1}{L} x_m^2[(n-1)L+k],$$

where k is the signal sample index.

An alternative version of the previously described iterative process is the case where the algorithm doesn't stop after a fixed number of iterations I, but after a criterion is met. In particular, the algorithm may stop at iteration i when the following condition is met:

$$|\lambda_m^{(i)} - 1| \le \epsilon, \forall m \quad (7)$$

where $\epsilon \ll 1$ is a predefined positive threshold.

Referring back to FIG. 2, each UGR may start and stop at arbitrary time instants, and the number of available UGRs at each time instant may vary. A constant time segment (or simply called time segment in several occasions from now on) may be defined as a collection of consecutive time-points on a grid where the number of available UGRs is constant. As shown in the example illustrated in FIG. 2, the three UGRs define five constant time segments, indexed with l=1, ..., 5. The time instants where the number of audio clips participating in the mix varies are called transition points. In the example of FIG. 2, it may be observed that the locations of the transition points are $k_1=1$, $k_2=n_3^{start}$, $k_3=n_2^{start}$, $k_4=n_3^{end}+1$, $k_5=n_1^{end}+1$, and $k_6=n_2^{end}+1=N+1$. To ensure the mixture resulting from the combination of tire M UGRs will not exhibit sudden level transitions when certain UGRs start or stop participating in the mix (e.g., when passing through transition points), the weights with which the different audio signals sum up in the mixing process may vary at each time interval l. This is the basic motivation behind the mixing approaches described with respect to the time domain below. In another aspect, also described below, the mixing weights may be subjected to variations along both time and frequency, thereby exploiting the additional degrees of freedom that a Time-Frequency domain mixing approach has to offer.

The mixing techniques presented below illustrate various operations for mixing media content at step 150. It is noted that the mixing may be performed without normalization of the UGRs or may be performed after the UGRs have been normalized using the normalization techniques described herein. However, it is noted that in aspects, alternative normalization procedures may be used.

Time Domain Mixing

Basic Segment-Wise Mixing

In line with the assumptions stated above, assume now that time index n now actually refers to signal sample values, thus the spacing between consecutive points on the grid is equal to one sampling period $T_s=1/F_s$. The augmented signal for UGR m may be represented as follows:

$$y_m[n] = \begin{cases} \hat{x}_m[n - n_m^{start} + 1] & \text{if } n \in U_m \\ 0 & \text{otherwise} \end{cases} \quad (8)$$

which extends from n=1 to n=N, to produce the N×1 augmented signal vector $y_m$. Letting $D_l=\{k_l, k_l+1, \ldots, k_{l+1}-1\}$ denote the set with the sample indexes which are in the range of the $l^{th}$ constant time segment, the notation $y_m^{(l)}$ may be used to refer to the portion of the $m^{th}$ augmented signal vector which belongs to the $l^{th}$ time segment. This vector may be constructed as follows:

$$y_{m,l} = y_m[n]|_{n \in D_l} = [y_m[k_l], \ldots, y_m[k_{l+1}-1]]^T \quad (9)$$

An augmented signal matrix representative of the $l^{th}$ time segment in all M audio recordings may be constructed according to:

$$Y_l = [y_{1,l}, \ldots, y_{M,l}] \quad (10)$$

Now, let $V_l$ denote the set with the active audio clip indexes at the $l^{th}$ time segment. At the $l^{th}$ time segment, all of the available signals may be superimposed to produce a mixture $s_l$ as follows:

$$s_l = Y_l w_l = \frac{1}{\sqrt{|V_l|}} Y_l 1 \quad (11)$$

where $1_{M \times 1}$ is a M×1 column vector full of ones and:

$$w_l = \frac{1}{\sqrt{|V_l|}} 1_{M \times 1} \quad (12)$$

is the so-called mixing weight vector particular to the $l^{th}$ time segment.

This mixing process may be repeated for all time segments l=1, ..., L and the final mixture may be derived by concatenating the mixture at each time segment as follows:

$$s = [s_1^T, \ldots, s_L^T]^T \quad (13)$$

The fact that Eq. (11) may be weighted by the square root of the number of active UGRs implies that audio clips participating in the mixing process are assumed to be uncorrelated to one another. Indeed this assumption is not 100% valid, since if the different audio channels were completely uncorrelated to one another, it wouldn't be possible to synchronize them in the first place. However it is reasonable to assume that even when these channels are synchronized, the degree of correlation among one another is rather small, so that a three dB increment in the mixture signal power should be anticipated every time that the number of participating UGRs is doubled. However, in the case that the different UGRs exhibit stronger correlations, superposition may have constructive or destructive effects. As this may result to unwanted level variations when passing through transition points, an approach for scaling the mixing weights so that this problem is avoided is described below.

Mixing with Target Power

To suppress audible level transitions between two consecutive constant time segments in the obtained mixture, an estimation of the target power $\tilde{q}_l$ at each time segment l may be used in order to scale the mixing weights derived in Eq. (12) so as to meet the target power. For example, using the weights $w_l$ from Eq. (12), the signal power of the mix in the $l^{th}$ time segment may be represented by:

$$q_l = w_l^T Y_l^T Y_l w_l \quad (14)$$

A new weight vector may now be constructed based on the ratio between the target and the actual signal power, which may be expressed as follows:

$$\tilde{w}_l = \frac{\sqrt{\tilde{q}_l}}{\sqrt{q_l}} w_l \quad (15)$$

One reasonable choice for the target power at the $l^{th}$ time segment may be given by:

$$\tilde{q}_l = \frac{1}{|V_l|} tr\{Y_l^T Y_l\} \quad (16)$$

where $tr\{\cdot\}$ denotes the trace of a matrix. In this case, tire mixing weights may become:

$$\tilde{q}_l = \frac{1}{|V_l|} \sqrt{\frac{tr\{Y_l^T Y_l\}}{1^T Y_l^T Y_l 1}} 1_{M \times 1} \quad (17)$$

Again, as in Eq. (11) the mixture at the $l^{th}$ time segment may be derived from $s_l = Y_l \tilde{w}_l$ and the full mixture may be the result of concatenating all time segments, as in Eq. (13).

Time-Frequency Domain Mixing

As briefly described above, working in the time domain is simple and computationally efficient, but the mixing process may gain additional flexibility when implemented in the Time-Frequency (TF) domain. A Fast Fourier Transform (TFT) based overlap-add method may be used in order to transform the signal from the time domain to the TF domain and then an Inverse Fast Fourier Transform (IFFT) to transform it back to the time domain. In general, transformations from the time domain to the TF domain and backwards can be mathematically expressed as:

$$y_{m,l}[n] \leftrightarrow Y_{m,l}(\tau, \omega) \quad (18)$$

where τ denotes the time-index, to the frequency index and $Y_{m,l}(\tau, \omega)$ refers to the portion of the $m^{th}$ augmented signal which is active at time segment l. A vector of size $V_l \times 1$ and containing the TF signal portions only from the signals which are active in the $l^{th}$ time segment may then be defined as follows:

$$Y_l(\tau,\omega) = Y_{m,l}(\tau,\omega)|_{m \in V_l} \tag{19}$$

The general equation describing the mixing process for the $l^{th}$ time segment in the TF domain may be expressed as:

$$S_l(\tau,\omega) = w_l^H(\tau,\omega) Y_l(\tau,\omega) \tag{20}$$

where $w_l(\tau, \omega)$ is the $V_l \times 1$ complex weight vector and $(\bullet)^H$ denotes a Hermitian transposition. It is noted that the mixing weights $w_l(\tau, \omega)$ may now be time-dependent, frequency-dependent or time- and frequency-dependent, providing remarkable flexibility in affecting the outcome of the mixing process. Aspects of two different techniques for choosing what these weights should be at each TF point are described below.

Maximum Component Elimination (MCE)

The MCE technique allows the mixing weights associated to some UGRs to occasionally become zero (e.g., to completely remove the contribution of some TF components in the mixing process), which may provide an efficient technique for removing the interference from sound sources which are in the foreground of each recording location. This technique may be applicable at time-segments where the number of active UGRs is greater or equal to two (e.g., $|V_l| \geq 2$ holds). In aspects, at each time and frequency index, the audio signal portions are ordered in descending order with respect to their energies, then, the most energetic component is removed from the mix by assigning a weight equal to zero. For example, let:

$$w_l(\tau,\omega) = [W_{1,l}(\tau,\omega), \ldots, w_{J,l}(\tau,\omega)]^T \tag{21}$$

be the weight vector $(J=|V_l|)$, then $w_{ij}$ takes the same value for all $j=1, \ldots, J$ except from the UGR index corresponding to the maximum component, which may be expressed as:

$$w_{j,l}(\tau, \omega) = \begin{cases} 0, & \text{if } |Y_{j,l}(\tau, \omega)| > |Y_{i,l}(\tau, \omega)| \forall i \neq j \\ \text{otherwise} \\ \frac{1}{\sqrt{|V_l| - 1}} \end{cases} \tag{22}$$

An extension of this approach to the case that not the single one but the $Q=2, 3, \ldots$ most energetic components are removed from the mix may also be utilized, and the constant value for all non-zero weights becomes $$\frac{1}{\sqrt{|V_l| - Q}}.$$

Intuitively, this may allow for more foreground energy to be removed from the mix, possibly at the cost of more audible artifacts.

An extension of the previous approach for the case that the operation is not specific to frequency bin but to a subband region containing multiple consecutive frequency bins may be utilized where the mixing weight may be specific to each subband index b and may be calculated as:

$$w_{j,l}(\tau, b) = \begin{cases} 0, & \text{if } |Z_{j,l}(\tau, b)| > |Z_{i,l}(\tau, b)| \forall i \neq j \\ \text{otherwise} \\ \frac{1}{\sqrt{|V_l| - 1}} \end{cases} \tag{23}$$

where $Z_{j,l}(\tau, \omega) = \Sigma_{\omega \in S_b} |Y_{i,l}(\tau, \omega)|^2$ and is the set with the frequency indexes belonging to the subband region.

Minimum Variance Mixing (MVM)

Similar to the MCE technique described above, an MVM technique may also be used to suppress interference components which are unique at each recording location and at the same time to reveal the components which are common within the different recordings. For example, an augmented signal covariance matrix may be defined as:

$$\Phi_l(\tau,\omega) = E\{Y_l(\tau,\omega) Y_l^H(\tau,\omega)\} \tag{24}$$

where $E\{ \}$ denotes expectation. The dimension of this matrix may be $|V_l| \times |V_l|$ and thus depends on the number of active UGRs at each constant time segment. The weights used for mixing may be derived as a solution to an optimization problem which involves minimization of the total signal power of the mixture signal subject to a linear equality constraint. In particular, the optimization problem may be written independently at each TF point and time segment l as:

Minimize $w_l^H(\tau,\omega)\Phi_l(\tau,\omega)w_l(\tau,\omega)$ so that $d_l^H w_l(\tau,\omega)$
$= 1$ (25)

As a solution to this optimization problem, one may use the formula:

$$w_l(\tau, \omega) = \frac{[\Phi_l(\tau, \omega) + \epsilon I]^{-1} d_l}{d_l^H [\Phi_l(\tau, \omega) + \epsilon I]^{-1} d_l} \tag{26}$$

where I is the $|V_l| \times |V_l|$ identity matrix and ε is a positive constant which may be defined by a user. It is noted that Eqs. (25) and (26) are well known as the cost function and the solution of the MVDR beamformer which involves a completely different setting, since beamforming requires particular microphone arrangements and assumes that the locations of the microphones are known (when dealing with UGRs, none of these conditions are true). This approach may be made applicable to the case of mixing the UGRs using the choice of:

$$d_l = \frac{1}{\sqrt{V_l}} 1 \tag{27}$$

where 1 is a $|V_l| \times 1$ vector full of ones. The mixture at each TF point may then be calculated by inserting the outcome of Eq. (26) in Eq. (20).

Segment-Wise Phase Alignment

Per-segment phase alignment may be required for segments with two or more active clips, so that destructive interference is avoided during the mixing process. In aspects, this phase alignment step is optional and concerns all the mixing approaches presented so far. The phase of the $m^{th}$ time-domain audio signal in the $l^{th}$ segment may be preserved or reversed depending on the sign of its cross-correlation with the other clips which are active in the same time segment. This process may be written as:

$$y_{m,l} = q_{m,l} y_m[n]|_{n \in D_l} \tag{28}$$

where $q_{m,l} = 1$ or $-1$, so that the following holds:

$$y_{i,l}^T y_{j,l} > 0 \forall i,j \in V_l \tag{29}$$

The $y_{m,l}$ vector presented in Eq. (29) may be used to replace the corresponding ones in Eqs. (9) and (18), without further affecting the presented approaches.

It should be noted that the criterion presented in Eq. (29) is somewhat ambiguous which can be seen by the fact that if $y_{i,l}^T y_{j,l} < 0$ holds for two clips indexed with i and j either the phase of j should be reversed, or that of j. A criterion for deciding which audio channel's phase should be reversed is that the same audio clip, when moving from one segment to the other, should undergo as few phase reversals as possible, so that discontinuities at the transition points are minimized and/or reduced.

As shown above, the method 100 provides various techniques for processing UGRs to produce a new audio file/content, where the UGRs may be captured by different users, at different locations of an event, and where the UGRs may capture different portions of the event with respect to time. Further, the method 100 may improve the quality of the final audio content relative to one or more individual UGR used to generate the final audio content. For example, the final audio content may be a multichannel recording and may be generated in a manner that minimizing/reducing the noticeability of transition points (e.g., where one or more UGRs start and/or stop in the mixed final audio content). In aspects, an extension of the proposed mixing approaches to a reproduction system with multiple output audio channels may be conceptualized; UGRs may be grouped into separate clusters, each group may then be processed independently from the other and the resulting audio streams may be panned to different directions. In aspects, methods such as stereophonic panning or Vector Base Amplitude Panning (VBAP) may be used.

Figure 3:
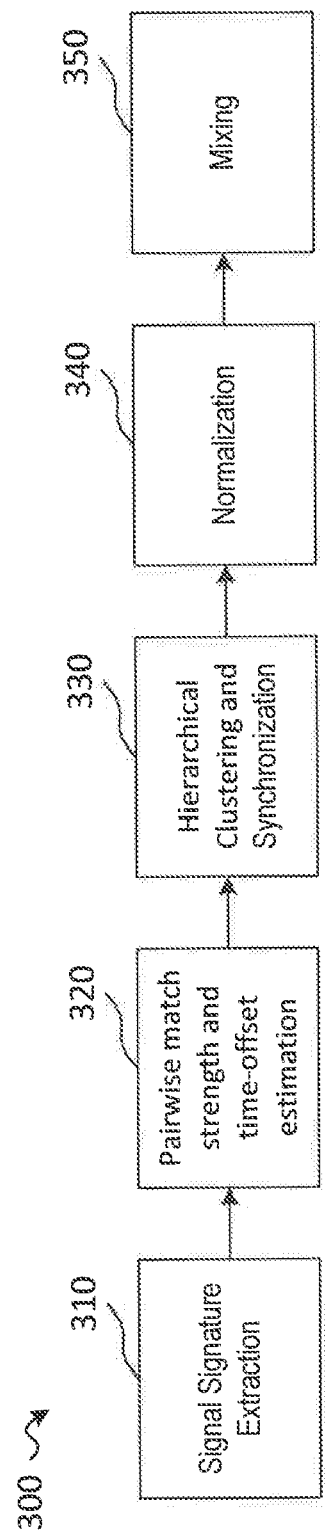
FIG. 3 is a flow diagram illustrating exemplary aspects of another method for mixing a content of plurality of UGRs according to embodiments of the present disclosure.

Referring to FIG. 3, a flow diagram illustrating exemplary aspects of another process for generating media content by mixing a plurality of UGRs in accordance with embodiments of the present disclosure is shown as a method 300. Although not shown in FIG. 3 in order to simplify the drawing, the method 300 may include receiving a plurality of UGRs. The plurality of UGRs may include audio content, visual content (e.g., video content, image content, etc.), and/or audio content and visual content. After the plurality of UGRs are received, the method 300 may perform various operations or steps configured to utilize the plurality of UGRs to generate new media content.

It is noted that the specific notations utilized to represent to processing described with reference to FIG. 1 and FIG. 3, while appearing different, convey similar techniques and processing for mixing UGR media content, as will become apparent from the description that follows. For example, the method of FIG. 3 provides an approach for mixing UGR media content that may include identifying relationships between different UGRs using match strength techniques and time-offset estimation, as well as clustering, synchronization, and normalization techniques. Additionally, it is noted that, as compared to FIG. 1, the notations utilized to describe these similar functionalities with reference to FIG. 3 may represent functional implementations of the UGR processing techniques described herein that achieve improved results (e.g., enhanced or higher quality media content mixes) and performance (e.g., more efficient processing and analysis of UGR media content.)

As shown in FIG. 3, the steps of the method 300 may include a step 310 where signal signature extraction is performed, a step 320 where match-strength and temporal offset processing is performed, a step 330 for performing hierarchical clustering and synchronization, a step 340 where normalization processing is performed, and a step 350 where UGRs are mixed to create new media content. The signal signature extraction step 310 may utilize a feature extraction process that accepts a UGR (e.g., a video recording or audio recording) as input and produces an output that provide a signature representative of the input UGR. The outputs (e.g., the signatures representative of the input UGRs) generated by the feature extraction process of the signal signature extraction step 310 may be utilized to determine a similarity between two signals (e.g., UGRs). The match-strength and temporal offset processing step 320 may be configured to assess the similarity between a pair of outputs (e.g., a pair of signal or UGR signatures) generated by the signal signature extraction step 310. In an aspect, features utilized to perform signature extraction may be extracted at regular time intervals, which may allow the match-strength and temporal offset step 320 to be applied to any pair of video or audio recordings regardless of what type of audio features and/or visual features are used.

Based on the pairwise relationships determined for a collection of UGRs, the hierarchical clustering and synchronization step 330 may separate the plurality of UGRs into clusters or groups and synchronize the members (e.g., the UGRs) of each cluster along the same time-axis, which may facilitate synchronous playback of the UGRs irrespective of whether the UGRs include audio content or visual content, such as video content and without concern as to whether the UGRs are received as different file types, such as audio files (e.g., .mp3 files, .wav files, .mp4 files, etc.) or video files (e.g., .mov files, .avi files, .wmv files, etc.). The normalization step 340 may be configured to modify signal levels of the UGRs, which may significantly improve the sound quality during playback of the UGRs and/or the sound quality of new media content generated from the UGRs, where playback and/or generation of the new media content may be facilitated by the mixing step 350. It is noted that the mixing step 350 may utilize various different audio mixing techniques, each of which may be applicable to any type of content (audio or video).

Additional exemplary aspects of the steps 310-350 of the method 300 are described in more detail below. It is noted that the contributions and improvements realized by each of the steps 310-350 may be realized independent of the other steps and that each of the steps 310-350 does not depend on the specific approach utilized in the previous step(s). For example, the hierarchical clustering step 330 does not depend on the type of similarity measure used to assess the relationships between UGRs during the match-strength and temporal offset processing step 320, and each of the various mixing approaches described in connection with the mixing step 350 may be utilized to generate new media content from a plurality of UGRs irrespective of what approach was used for the hierarchical clustering and synchronization step 330 or the normalization step 340, if any such approach was used.

As explained above, a pairwise match strength and time-offset estimation may be utilized to assess the similarity between a pair of outputs (e.g., a pair of signal or UGR signatures) generated by the signal signature extraction step 310. An exemplary process for generating signal signatures suitable for supporting pairwise match strength and time-offset estimation in accordance with the present disclosure will now be described.

As explained above, a feature extraction process (e.g., step 310 of FIG. 3) may accept a UGR (e.g., a video recording or an audio recording) as input and produce an output that provides a representative signature of the input UGR. For the ith video or audio recording, the output of the feature extraction step 310 may include data in the form of an $N_i \times B$ binary matrix $\tilde{F}_i$, where $N_i$ is related to the duration of the recording, B depends on the dimensionality of the signal signature and may be any integer number equal or greater to 1. This matrix may be obtained using multiple types of features, acoustic features and/or visual features. In an aspect, this matrix may be constructed by extracting features at regular time intervals, which, as explained above, may allow the match-strength and temporal offset step 320 to be applied to any pair of UGRs regardless of what type of audio features and/or visual features were used. Saying that matrix $\tilde{F}_i$ is binary, means that each element of $\tilde{F}_i$ can have only one out of two different numeric or symbolic values. If this holds, it can be transformed to new matrix $F_i$ such that each element of this new matrix is either equal to 1 or equal to −1. For example, in case each element of $\tilde{F}_i$ takes a value in the set $\{0,1\}$, a new matrix $F_i$ can be constructed from $\tilde{F}_i$ by converting the value of all elements equal to 0 to the value of −1. In case the elements of $\tilde{F}_i$ are symbolic, matrix $F_i$ can be constructed from $\tilde{F}_i$ by specifying an arbitrary association between the two symbols and the numeric values of 1 and −1.

The match-strength and temporal offset step 320 may receive two signal signatures $F_i$ and $F_j$ of size $N_i \times B$ and $N_j \times B$ respectively, and provide the two signal signatures to an unbiased similarity estimator configured to assess the similarity $r_{ij}$ between the two signals. An exemplary unbiased similarity estimator designed based on a modification of the classical cross-correlation operation involving two finite-length discrete sequences, is described in more detail below.

The generalized cross-correlation between two finite length sequences x and y of length $N_x \times 1$ and $N_y \times 1$ respectively may be defined as follows:

$$R_{x,y}(\tau) = \begin{cases} \frac{1}{\sqrt{u(\tau)}} \sum_{n=1}^{u(\tau)} x(n+|\tau|)y(n), & -N_x + 1 < \tau < 0 \\ \frac{1}{\sqrt{u(\tau)}} \sum_{n=1}^{u(\tau)} x(n)y(n+\tau), & 0 < \tau < N_y - 1 \end{cases} \quad (30)$$

where $u(\tau)$ is defined as $$u(\tau) = \begin{cases} \min\{N_x, N_y, N_x - |\tau|\}, & -N_x + 1 < \tau \leq 0 \\ \min\{N_x, N_y, N_y - \tau\}, & 0 < \tau < N_y - 1 \end{cases} \quad (31)$$

and min{ } returns the minimum number in a set of numbers. This cross-correlation scheme produces $N_x + N_y - 1$ values, defined on values of the time-lag that the overlap between the two sequences is at least 1 sample. It can be observed that the value at each lag is normalized with respect to the square root of the number of summation terms ($\sqrt{u(\tau)}$) in the right side of Eq. (30). This type of weighting is designed to remove the bias due to the fact that, at different values of the time-lag $\tau$, the amount of available information varies. A modified version of Eq. (30) can be derived by taking into account $\mu_x$ and $\mu_y$, i.e., the mean value of sequences x and y. In this case Eq. (30) can be rewritten as:

$$R_{x,y}(\tau) = \begin{cases} \frac{1}{\sqrt{u(\tau)}} \sum_{n=1}^{u(\tau)} (x(n+|\tau|) - \mu_x)(y(n) - \mu_y), & -N_x + 1 < \tau < 0 \\ \frac{1}{\sqrt{u(\tau)}} \sum_{n=1}^{u(\tau)} (x(n) - \mu_x)(y(n+\tau) - \mu_y), & 0 < \tau < N_y - 1 \end{cases} \quad (32)$$

where $u(\tau)$ is defined as before from Eq. (31).

In several cases, it may be beneficial to calculate the cross-correlation between two sequences in the frequency domain, using for example a Fourier transform. This may significantly reduce the computational complexity of the operations. In this case the proposed cross-correlation scheme can be obtained as follows:

1. A program may be used to obtain a sequence that returns the biased cross-correlation $C_{x,y}(\tau)$ between two sequences x and y. Let c be the sequence with the cross-correlation values returned by the program.

2. Weight each term in c with $$\frac{1}{\sqrt{u(\tau)}},$$

where $u(\tau)$ is defined as a function of the time lag according to Eq. (31).

It is to be noted that some routines may require that the input sequences x and y are of equal length. In this case, the shortest of the two sequences, say x, may be padded with zeros after the last sample so that its length becomes equal to $N_y$. The aforementioned method may be applied as is to the two sequences $\hat{x}$ and y, where now $\hat{x}$ is produced from x by adding $N_y - N_x$ zeros after the last sample.

The above-described exemplary unbiased similarity estimator may be utilized to estimate a match strength between a pair of UGRs. For example, let $F_i^b$ denote the bth column of the signal signature matrix $F_i$. The cross correlations between two signal signature matrices $F_i$ and $F_j$ is obtained from $$R_{F_i, F_j}(\tau) = \sum_{b=1}^{B} R_{F_i^b F_j^b}(\tau), \quad (33)$$

where $R_{F_i^b F_j^b}(\tau)$ denotes the modified cross-correlation operation defined above. Note that if a zero-padding approach is required for implementing the cross-correlation function, the signal signature vectors $F_i^b$ may also contain zeros apart from the values of 1 and −1. In an aspect, a maximum value of the cross-correlation, which may be expressed as:

$$r_{ij} = \max R_{F_i, F_j}(\tau) \quad (34)$$

may be used as an estimation of the match strength or similarity between the two UGRs (e.g., recordings i and j), where max{ } returns the maximum value from a set of numbers. An additional outcome of this process is the time-frame difference, which may be defined as:

$$\tau_{ij} = \arg\max_{\tau} R_{F_i, F_j}(\tau) \quad (35)$$

which potentially defines the temporal offset that is required for synchronizing recordings i and j.

The above-described process may be applied for all pairwise combinations {i, j} such that j>i and the corresponding similarity measures (or match strengths) and temporal offsets can be stored in M×M matrices $\tilde{R}$ and $\tilde{T}$ respectively. These matrices may be populated only above the main diagonal and all other values may be initially set equal to zero. From these half-populated matrices one may easily produce versions of fully populated matrices, using the operations $R=\tilde{R}+\tilde{R}^T$ and $T=\tilde{T}-\tilde{T}^T$. The minus sign in ($\tilde{T}-\tilde{T}^T$) is explained by the fact that if $\tau_{ij}$ is the temporal offset that synchronizes recording j with recoding i, then $\tau_{ij}=-\tau_{ij}$ should hold.

As explained above, the hierarchical clustering and synchronization step 330 may be configured to identify relationships among the plurality of UGRs and group the UGRs identified as sharing or having relationships with each other into one or more clusters. Consider a collection of UGRs indexed by m=1, . . . , M. Let M×M matrix R denote the matrix containing all pairwise match strengths between UGRs, using for example the techniques described above. Letting $r_{ij}$ denote the element at the ith row and jth column of R, a distance matrix D, which may be another M×M matrix may be constructed such that $$D_{ij} = \frac{1}{R_{ij}} \quad (36)$$

Matrix D may be a symmetric matrix which is informative about all pairwise distances between UGRs. An additional M×M matrix T is assumed to be available, such that $\tau_{ij}$, the element in the ith row and jth column of T, denotes the number of audio samples (or time-frames) that ith recording must be delayed with respect to the jth recording in order to have the two recordings synchronized along the same temporal axis. This matrix is referred to as the temporal displacement matrix from now on. Several approaches to calculate these temporal displacements exist; however, as explained above, the synchronization process disclosed herein is not specific to how T is calculated. In an aspect, the temporal information provided by the temporal displacement matrix T and the information provided by the distance matrix D may be utilized to group different UGRs into clusters and to synchronize UGRs within the same cluster (if there are more than two), as described in more detail below.

(1.) Assuming each UGR represents an observation and that $D_{ij}$, i≠j is the distance between observations i and j, an agglomerative hierarchical cluster tree linking all M UGRs may be generated.

(2.) The number of clusters and the identities of the UGRs in each cluster may be estimated by setting a threshold $D_{max}$ and requesting that the distance that a UGR should exhibit before entering a particular cluster is smaller than $D_{max}$. This may produce a minimum of one and a maximum of M clusters and the number of UGRs in each cluster will range between 1 and M.

(3.) A graph consisting of M nodes may be constructed so that the $m^{th}$ node corresponds to the $m^{th}$ UGR and so that initially, no node is connected to another node. Based on the results of hierarchical clustering, as obtained from step (1.) above, connect only those nodes which are in the same cluster, as obtained from the step (2.) above.

(4.) For all clusters with a number of members L>1, the linkage will result in a tree. The UGRs in each tree may be synchronized as follows. First, choose any UGR in the tree as a reference UGR. Now, let p(i→r) denote the path connecting node i with reference node denoted with r. Obtain the temporal displacement $Q_{i,r}$ that synchronizes UGR i with UGR r by summing together all time offsets specific to the edges that form the path from i to r. For example, if r=1 and i=8, and the path connecting UGR 8 with UGR 1 is the set {8, 3; 4, 1}, then $Q_{8,1}=\tau_{8,3}+\tau_{3,4}+\tau_{4,1}$, with τij extracted directly from the temporal displacement matrix T. This process may be repeated until all nodes in a particular cluster are synchronized with the reference node r.

Figure 4:
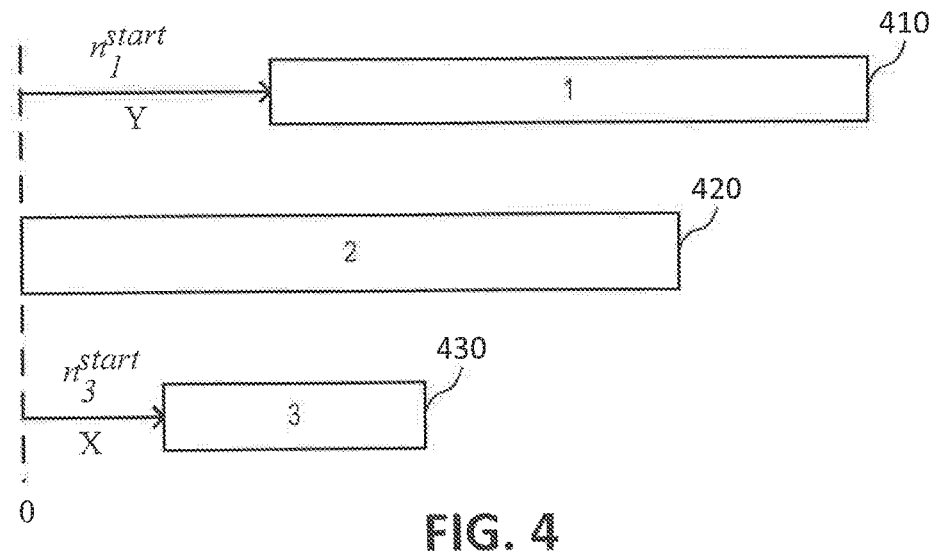
FIG. 4 is a diagram illustrating aspects of extracting information from connected UGRs.

(5.) From the previous process, a set of L−1 temporal offsets is produced. The hierarchical synchronization process may be finalized as follows. If all L−1 temporal offsets are equal to or greater than zero, then the UGR with index r is the earliest starting UGR, i.e., the recording that was initiated earlier than any other recording in the particular cluster. For example, and referring to FIG. 4, a diagram illustrating aspects of extracting information from connected UGRs is shown. As shown in FIG. 4, the three connected UGRs includes a first UGR 410, a second UGR 420, and a third UGR 430. The UGRs 410, 420, 430 may be "connected" in the sense that they include audio content and/or video content that overlaps with respect to time, which may result in the UGRs 410, 420, 430 being grouped into a single cluster. Because the first UGR 410 starts "Y" units of time after the start of the second UGR 420 and the third UGR 430 starts "X" units of time after start of the second UGR 420, the second UGR 420 is the earliest starting UGR ($n_2^{start}=0$). Referring back to FIG. 3, if all L−1 temporal offsets are not equal to or greater than zero (e.g., if there are negative temporal offsets), find the UGR index in the cluster returning the largest negative value $$k = \underset{i}{\operatorname{argmin}} Q_{ir} \quad (37)$$

Then, repeat the process of the previous step by setting UGR with index k as the reference UGR. For the UGR with index k, set $n_k^{start}=0$. For all other UGRs in the same cluster, set $n_k^{start}=Q_{ik}$. The values of $n_k^{start}$ will be non-negative and denote the sample (or time-frame) delay value required for synchronizing each UGR with respect to UGR with index k, which is the earliest starting UGR in the given cluster.

The above-described clustering and synchronization techniques, which have been provided for purposes of illustration, rather than by way of limitation, may be used to generate synchronization data. In an aspect, the synchronization data may be utilized to facilitate synchronized playback of the associated UGRs. In an additional aspect, the synchronization data may be utilized by additional processes, such as the mixing step 350, described in more detail below.

As explained above, the method 300 may include a normalization step 340. It is noted that the exemplary normalization processes described below may be applied to so-called connected recordings, e.g., recordings that belong to the same cluster. The normalization process has various advantages. First of all, it ensures that all audio clips have equal significance in the mixing process, avoiding for example recordings which are acquired at a small distance from the sound sources to mask those captured at distances further apart. Also, accurate normalization is important for constructing a mix without discontinuities and audible level transitions, which are expected to occur at a transition point where a particular UGR within the cluster starts or stops participating in the mixing process.

Consider a collection of M≥2 connected UGRs. Assume also that all UGRs are available in pulse code modulation (PCM) format and let $x_m[n]$ denote the value of the nth sample of the mth UGR. The normalization process may define a set of M normalization gains $g=[g_1, \ldots, g_M]^T$ to scale all recordings according to $\hat{x}_m[n]=g_m x_m[n]$, $\forall m$.

Figure 5:
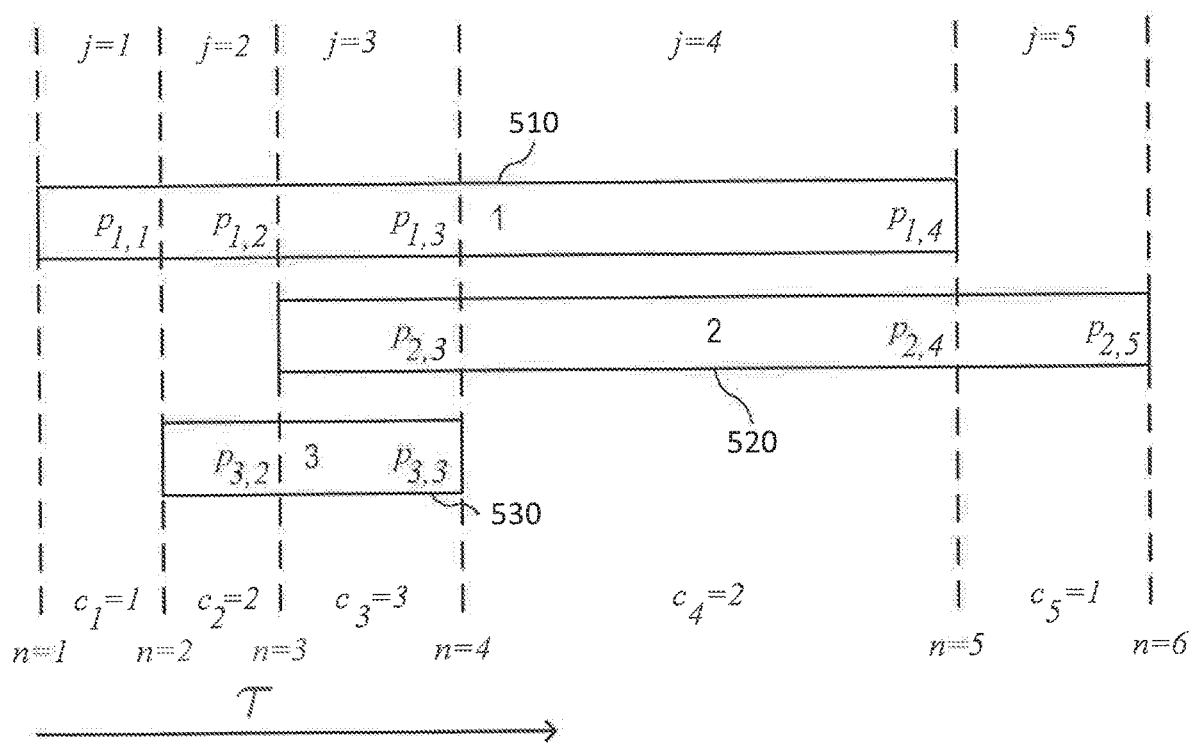
FIG. 5 a diagram illustrating additional aspects of extracting information from connected UGRs.

Without loss of generality, an illustrative example of the various notations based on the three UGRs will now be described. Referring briefly to FIG. 5, a diagram illustrating additional aspects of extracting information from connected UGRs is shown. As shown in FIG. 5, the three mutually overlapping UGRs include a first UGR 510, a second UGR 520, and a third UGR 530. Each of the UGRs 510, 520, 530 may include a recording of audio content, and each of the UGRs 510, 520, 530 may have been captured at different distances from a source of the audio content. As shown in FIG. 5, the three UGRs 510, 520, 530 may define six transition points n and five time segments j. The points in time corresponding to the beginning or ending of each UGR define the so-called transition points n, and j is used to index a time segment extending between two consecutive transition points. In FIG. 5, $p_{m,j}$ denotes the energy of the unsealed mth UGR in the jth segment and $c_j \in \mathbb{N}^+$ denotes the plurality of UGRs which are active in the jth segment. A UGR is considered to be active or inactive depending on whether the recording process was ongoing at the particular point in time or not. The notation $\mathbb{S}$ (m) may be used to denote the set with the segment indexes which fall within the range of the mth UGR. If j is not an element of the set $\mathbb{S}$ (m), then $p_{m,j}=0$.

Referring back to FIG. 3, an exemplary process that may be followed during the normalization step 340 to normalize the UGRS is illustrated in Table 2 below.

TABLE 2

Algorithm for Iterative Normalization

Input: Initial energy profiles $p_m^{(0)}$, $\forall m$,
Input: number of iterations I
Output: normalization gains $g_m$, $\forall m$
for i = 1 to I do
  for k = 1 to M do $$\lambda_k^{(i)} = \frac{\sum_{j \in \mathbb{S}(k)} \frac{1}{c_j} \sum_{m=1}^{M} p_{m,j}^{(i-1)}}{\sum_{j \in \mathbb{S}(k)} p_{k,j}^{(i-1)}}$$

$$p_k^{(i)} \leftarrow \lambda_k^{(i)} p_k^{(i-1)}$$

end for
end for $$g_k = \sqrt{\prod_{i=1}^{I} \lambda_k^{(i)}}, \forall k = 1, \ldots, M$$

Letting now $x_m[n]$ represent the sound signal in audio clip m, this signal can be replaced with its normalized version, which may be expressed as:

$$\hat{x}_m[n]=g_m \times_m[n] \quad (38)$$

This process may be repeated for all audio clips m=1, ..., M.

In addition to the previously described iterative process, another normalization technique that uses an algorithm that doesn't stop after a fixed number of iterations I may be used in accordance with aspects of the present disclosure. This algorithm may be configured to stop after a stop criterion is met. For example, one such criterion may be the following: Stop at iteration i when the following condition is met:

$$|\lambda_m^{(i)}-1| \le \in, \forall m \quad (39)$$

where $\in \ll 1$ is a predefined positive threshold.

As described above, the mixing step 350 may be configured to combine the synchronized UGRs in order to produce a monophonic mixture that provides a better representation of the acoustic event. The mixing step 350 may utilize various mixing techniques configured in accordance with aspects of the present disclosure, as described in more detail below.

As explained above, the mixing step 350 may utilize a time-domain mixing technique to combine the synchronized UGRs. Consider a collection of M≥2 recordings forming a connected graph. Assume also that all recordings are available at PCM format and let $x_m[n]$ denote the value of the nth sample of the mth recording. All recordings are assumed to be available at the same sampling rate $F_s$. For each recording m=1, ..., M it is assumed that there is prior knowledge of $n_m^{start}$, which denotes the sample delay value of each recording with respect to the earliest starting UGR, as described above with respect to FIG. 4. This synchronization information may be used to synchronize all UGRs along the same temporal axis such that there is a one-to-one correspondence between sample index n and time t through $t=(n-1)/F_s$. $\mathbb{S}$ (n) may be defined as a set with the UGR indexes that are active at time $t=(n-1)/F_s$ and $L_n$ may denote the cardinality of that set, where $1 \le L_n \le M$. This information may, for example, be obtained by applying the hierarchical clustering and synchronization process described above.

The time-domain mixer may be implemented through;

$$s[n] = \frac{1}{\sqrt{L_n}} \sum_{m \in \mathbb{S}(n)} x_m[n - n_m^{start} + 1] \quad (40)$$

where $m \in \mathbb{S}$ (n) returns the UGR indexes that were active at time n. Observe that at the right hand side of Eq. (11), the mixture is weighted by the inverse of the square root of the number of summation terms.

An additional version of the time-domain mixer can be realized by working not with the original UGRs, but with their normalized versions $\tilde{x}_m[n]$, for m=1, ..., M as may be derived from the normalization step 340 described above. In this case, the mixing process can be expressed as:

$$s[n] = \frac{1}{\sqrt{L_n}} \sum_{m \in \mathbb{S}(n)} \hat{x}_m[n - n_m^{start} + 1] \quad (41)$$

As shown above, the mixing step 350 may be configured to mix a plurality of UGRs based on the original UGRs (e.g., without normalization) or based on normalized versions of the UGRs, as may be derived from the normalization step 340. Thus, the mixing step 350 is not dependent upon the normalization step 340, which may be skipped or omitted if desired. However, as explained above, the normalization step 340 may provide improvements to the overall sound quality achieved by the mixing step 350, which may be advantageous for some applications.

In addition to utilizing time-domain mixing techniques, the mixing step 350 may also be configured to implement time-frequency-domain mixing. Working in the time domain is simple and computationally efficient, but additional flexibility with respect to the mixing process may be realized when the mixing step 350 is implemented in the Time-Frequency (TF) domain. A Fast Fourier Transform (FFT) may be used to transform the signal from the time domain to the TF domain and then an Inverse Fast Fourier Transform (IFFT) may be used to transform the signal back to the time domain. In general, transformations from the time domain to the TF domain and backwards can be mathematically expressed as:

$$x_i[n] \leftrightarrow X_i(\tau,\omega) \quad (42)$$

where $\tau$ denotes the time-index, $\omega$ a the frequency index. Here $X_i(\tau,\omega)$ defines a complex signal portion that is specific to a TF point, representing the smallest piece of information that can be manipulated for constructing the final mixture. In the general case, larger signal portions can be considered by using a partitioning of the spectrum into multiple subbands, so that each frequency subband contains multiple successive Fourier coefficients. To illustrate, let $\Omega(o)$ denote the set with the frequency indexes in the oth subband. Vector $X_i(\tau,o)$ represents the signal portion from the ith UGR containing all the complex Fourier coeffcients in the oth subband:

$$X_i(\tau,\omega) = [X_i(\tau,\omega)]_{\omega \in \Omega(o)} \quad (43)$$

where $[\cdot]_i$ denotes vertical concatenation.

Mixing techniques intended for use with UGRs may need to account for a temporally varying number of input channels. Different UGRs may span different temporal versions of the event and therefore the number of components available may vary with time frame $\tau$. Further to this, one may decide to disregard certain subband indexes (or subband channels) from certain UGRs, due to average energy criteria, for example. Now assume a general channel selection process that operates on a given dataset of M connected UGRs to return at each time and subband index, and $\tau$ and o respectively, a set of active UGR indexes $\mathbb{S}(\tau,o)$ such that the set $\mathbb{S}(\tau,o)$ is not empty, and let $L_{\tau,o}$ be a positive integer denoting the cardinality of set $\mathbb{S}(\tau,o)$, where $1 \leq L_{\tau,o} \leq M$ and there is a one-to-one correspondence between available UGR portions indexed with i and selected UGR portions indexed with l. In what follows, the notation $\hat{X}_l(\tau,\omega)$, $l=1, \ldots, L_{\tau,o}$, is used to refer to the different components from $L_{\tau,o}$ selected UGR portions.

A general equation for a mixing process in the TF domain may be written as:

$$S(\tau, o) = \sum_{l}^{L_{\tau,o}} w_l(\tau, o) \hat{X}_l(\tau, o), \quad (44)$$

The simplest approach for mixing the selected channels is to consider equal weights, in which case the output signal can be derived from:

$$S(\tau, o) = \frac{1}{\sqrt{L_{\tau,o}}} \sum_{i \in \mathbb{S}(\tau,o)} X_i(\tau, o), \quad (45)$$

$$= \frac{1}{\sqrt{L_{\tau,o}}} \sum_{l}^{L_{\tau,o}} \hat{X}_l(\tau, o), \quad (46)$$

Similar to the time-domain mixing technique described above, $$\frac{1}{\sqrt{L_{\tau,o}}}$$

may be used to balance the appearance and disappearance of certain input channels in the mix, based on the assumption of independence of the UGRs. Note that using $S(\tau,o)$, the final time-domain signal can be designed using the inverse Fourier transform. It is noted that the time-frequency domain approaches presented above may also be applied to cases where each subband region consists of exactly one frequency bin.

In addition to the above described time-domain and TF domain mixing techniques, the mixing step 350 may also be configured to utilize maximum component elimination mixing techniques. For example, assume a channel selection process that operates on a given dataset of M connected UGRs to return at each time and subband index, and o respectively, a set of active UGR indexes $\mathbb{S}(\tau,o)$ such that the set $\mathbb{S}(\tau,o)$ is not empty and let $L_{\tau,o}$ be the positive integer denoting the cardinality of set $\mathbb{S}(\tau,o)$, where $1 \leq L_{\tau,o} \leq M$ and there is a one-to-one correspondence between available UGR portions indexed with i and selected UGR portions indexed with l. Similar as before, the notation $\hat{X}_l$, $l=1, \ldots, L_{\tau,o}$, may be used to refer to the different components from $L_{\tau,o}$ selected UGR portions.

The maximum component elimination mixing process described in this section may be implemented in the time subband domain through:

$$S(\tau, o) = \sum_{l}^{L_{\tau,o}} w_l(\tau, o) \hat{X}_l(\tau, o), \quad (47)$$

with weights $w_l$, $l=1, \ldots, L_{\tau,o}$ defined as follows. At each time and subband index, the $L_{\tau,o}$ audio signal portions are ordered in descending order with respect to their energies. Then, the most energetic component is removed from the mix by assigning a weight equal to zero. Mathematically, this can be formulated as:

$$w_l(\tau, o) = \begin{cases} 0, & \text{if } \|\hat{X}_l(\tau, o)\|_2 > \|\hat{X}_k(\tau, o)\|_2 \forall k \neq l \\ \frac{1}{\sqrt{L_{\tau,o} - 1}}, & \text{otherwise} \end{cases}, \quad (48)$$

where $\|\cdot\|_2$ denotes the Euclidean norm of a vector. An extension of the previous approach is to exploit prior information about the average signal power in each channel. Let $P_m(o)$ denote the average power spectral density of the mth UGR in the oth subband, and assume that this quantity is precalculated for all $m=1, \ldots, M$ UGRs. In this case, $$\frac{\|\hat{X}_m(\tau, o)\|_2^2}{P_m(o)}$$

provides a normalized estimation of the local energy and the weights are in this case derived from:

$$\hat{w}_l(\tau, o) = \begin{cases} 0, & \text{if } \frac{\|\hat{X}_l(\tau, o)\|_2^2}{P_l(o)} > \frac{\|\hat{X}_k(\tau, o)\|_2^2}{P_k(o)} \forall k \neq l \\ \frac{1}{\sqrt{L_{\tau,o} - 1}}, & \text{otherwise} \end{cases} \quad (49)$$

The output signal may then be obtained from:

$$S(\tau, o) = \sum_{l}^{L_{\tau,o}} \hat{w}_l(\tau, o) \hat{X}_l(\tau, o), \quad (50)$$

An extension of the approaches for implementing mixing via maximum component elimination techniques presented above would be the case that not the single one but the Q=2, 3, . . . most energetic components are removed from the mix, and the constant value for all non zero weights becomes $$\frac{1}{\sqrt{L_{\tau,o} - Q}}.$$

Intuitively, this may allow more foreground energy to be removed from the mix, possibly at the cost of more audible artefacts.

Note that using $S(\tau,o)$, the final time-domain signal can be designed using the inverse Fourier transform. Also, another extension to which the above-described mixing technique may be applied is the case where each subband region consists of exactly one frequency bin.

The mixing step 350 may also be configured to mix UGRs based on a minimum variance mixing technique, which attempts to suppress interference components unique to each recording location and at the same time reveal the components which are common within the different UGRs. Assuming a channel selection process that operates on a given dataset of M connected UGRs to return at each time and subband index, and o respectively, a set of active UGR indexes $\mathbb{S}(\tau,o)$ such that the set $\mathbb{S}(\tau,o)$ is not empty and let $L_{\tau,o}$ be a positive integer denoting the cardinality of set $\mathbb{S}(\tau,o)$, where $1 \leq L_{\tau,o} \leq M$ and there is a one-to-one correspondence between available UGRs indexed with i and selected UGRs indexed with l. Similar as before, the notation $\hat{X}_l(\tau,o)$, l=1, . . . , $L_{\tau,o}$, may be used to refer to the signal portion of the lth selected UGR.

Now let $R(\tau,o)$ be the $L_{\tau,o} \times L_{\tau,o}$ matrix with elements along the diagonal equal to:

$$R_{l,l}(\tau,o) = E\{\hat{X}_l^H(\tau,o)\hat{X}_l(\tau,o)\} \quad (51)$$

and all other elements equal to zero $R_{i,j:i \neq j} = 0$. Here $E\{\cdot\}$ denotes expectation. MVM may be formulated as a special case of the MVDR beamformer. Traditionally, MVDR beamforming is implemented using a complex and fully populated covariance matrix $R(\tau,o)$. In the presented approach the covariance matrix is real and diagonal (the only non-zero elements are the diagonal ones). The following optimization problem may now be defined as:

$$\text{Minimize } q(\tau,o)^T R(\tau,o) q(\tau,o) \text{ so that } \mathbb{I}^T q(\tau,o)=1, \quad (52)$$

where vector $q(\tau,o)=[q_1(\tau,o), \ldots, q_{L_{\tau,o}}(\tau,o)]^T$ is related to the mixing weights through $q_l(\tau,o)=w_l^2(\tau,o)$ and $\mathbb{I}$ is the $L_{\tau,o} \times 1$ vector with all ones. A solution to this optimization problem, may be expressed using the formula:

$$q(\tau, o) = \frac{[R(\tau, o) + \epsilon I]^{-1} \mathbb{I}}{\mathbb{I}^T [R(\tau, o) + \epsilon I]^{-1} \mathbb{I}}, \quad (53)$$

where I is the $L_{\tau,o} \times L_{\tau,o}$ identity matrix and $\epsilon$ is a positive constant which can be defined by the user. The final weights may be calculated from $w_l(\tau,o)=\sqrt{q_l(\tau,o)}$ and the mixture at each TF point may be derived from:

$$S(\tau, o) = \sum_{l}^{L_{\tau,o}} w_l(\tau, o) \hat{X}_l(\tau, o), \quad (54)$$

Observe that the mixing weights are real and positive, i.e., $w_l(\tau,o) \in \mathbb{R}^+$, l=1, . . . , $L_{\tau,o}$.

Observe that the equality constraint $\mathbb{I}^T q(\tau,o)=1$ in Eq. (23) is formulated with the $L_{\tau,o} \times 1$ of all-ones vector. In a more general scheme, the technique can be implemented with any fixed real vector d, such that all elements of d are positive. In this case the constraint becomes $d^T q(\tau,o)=1$.

The solution in the general case then reads:

$$q(\tau, o) = \frac{[R(\tau, o) + \epsilon I]^{-1} d}{d^T [R(\tau, o) + \epsilon I]^{-1} d}, \quad (55)$$

and the mixing weights are derived from $w_l(\tau,o)=\sqrt{q_l(\tau,o)}$.

An alternative to the previous approach may be defined based on a different version of the covariance matrix that relies on prior information regarding the power spectral densities of the participating UGRs. More particularly, given an a-priori estimation of the energy at each subband index $P_i(o)$, $\forall_i = 1, \ldots, M$, the new covariance matrix $\hat{R}$ is again a diagonal matrix defined through:

$$\hat{R}_{l,l}(\tau, o) = \frac{E\{\hat{X}_l^H(\tau, o)\hat{X}_l(\tau, o)\}}{\hat{P}_l(o)}, \quad (56)$$

where $\hat{P}_l(o)$ is equal to the prior of the $l^{th}$ selected UGR in subband o. Depending on how the constraint is formulated, this will result to a new solution $\hat{q}(\tau,o)$, calculated either in the context of Eq. (24) or in the context of Eq. (26). The final signal can be in either case calculated with use of Eq. (25) using:

$$w_l(\tau,o)=\sqrt{\hat{q}_l(\tau,o)} \quad (57)$$

where $\hat{q}_l(\tau,o)$ is the $l^{th}$ element of $\hat{q}(\tau,o)$.

Note that using $S_{(\tau,o)}$, the final time-domain signal can be designed using the inverse Fourier transform. The approaches presented above may also be extended to the case where each subband region consist of exactly one frequency bin.

As shown above, the steps of the method 300 may implement various techniques to facilitate mixing of UGRs. While each of the above-described steps of the method 300 have been demonstrated to provide certain technical improvements and advantages, it is to be understood that the steps of the method 300, and their associated technical improvements and advantages, are not dependent upon the specific manner in which other steps are implemented. For example, the various mixing techniques described above may be utilized by the mixing step 350 to mix UGRs without requiring execution of the normalization step 340; however, it is noted that where the normalization step 340 is also utilized, the quality of the mixed content resulting from the mixing step 350 may be improved. Thus, the method 300 provides new technological processes that improve the functioning of computer systems by enabling the automation of various tasks for mixing UGR content.

Figure 6:
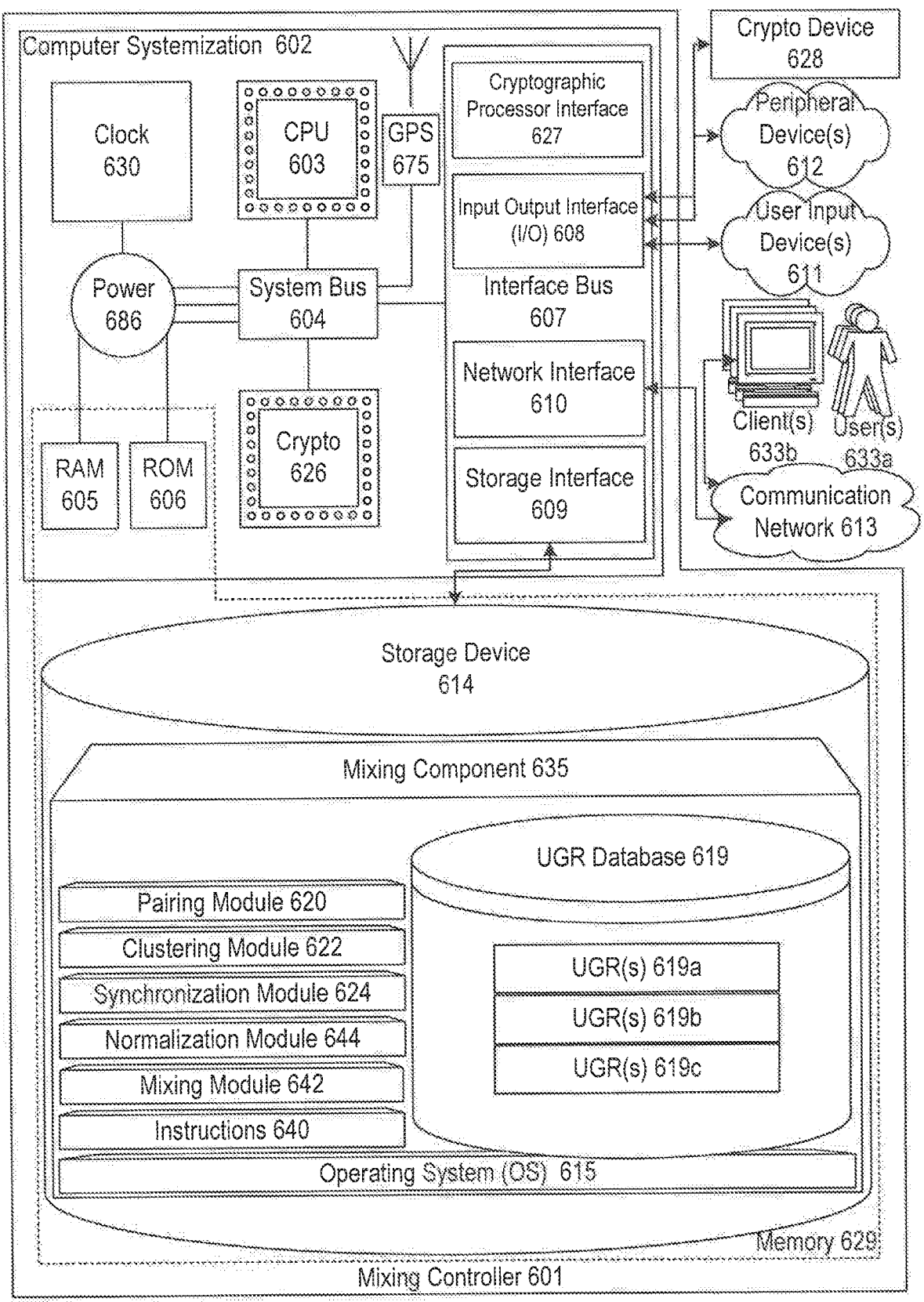
FIG. 6 shows a block diagram illustrating exemplary aspects of a mixing controller for mixing audio samples in accordance with embodiments of the present disclosure.

FIG. 6 shows a block diagram illustrating exemplary aspects of a mixing controller for mixing audio samples in accordance with embodiments of the present disclosure.

Mixing Controller

Referring now to FIG. 6, a block diagram illustrating exemplary aspects of a mixing controller for mixing audio samples in accordance with embodiments of the present disclosure is shown as mixing controller 601. In aspects, the mixing controller 601 may serve to mix UGR content generated by one or more users in accordance with aspects of the present disclosure, as described herein.

Typically, users, which may be people and/or other systems, may engage information technology systems (e.g., computers, mobile devices, such as tablet computing devices and/or smart phones, and the like) to capture multimedia content (e.g., audio content and/or audio and video content), referred to as UGRs, which may be obtained by the mixing controller 601. In aspects, the mixing controller 601 may obtain the UGRs from the users directly (e.g., the UGRs may be uploaded to the mixing controller 601). In additional or alternative aspects, the mixing controller 601 may obtain the UGRs from one or more external systems, such as social media platforms or other Internet-based platforms where users may publish/provide UGR data. The mixing controller 601 may then, in turn, employ processors to process the UGRs (e.g., to mix the UGRs and/or perform other operations in accordance with aspects of embodiments); such processors 603 may be referred to as central processing units (CPU). One form of processor is referred to as a microprocessor. CPUs use communicative circuits to pass binary encoded signals acting as instructions (e.g., instructions 630) to enable various operations. These instructions may be operational and/or data instructions containing and/or referencing other instructions and data in various processor accessible and operable areas of memory 629 (e.g., registers, cache memory, random access memory, etc.). Such communicative instructions may be stored and/or transmitted in batches (e.g., batches of instructions) as programs and/or data components to facilitate desired operations. These stored instruction codes (e.g., programs), may engage the CPU circuit components and other motherboard and/or system components to perform desired operations. One type of program is a computer operating system, which may be executed by a CPU on a computer. The operating system enables and facilitates users to access and operate computer information technology and resources. Some resources that may be employed in information technology systems include input and output mechanisms through which data may pass into and out of a computer, memory storage into which data may be saved, and processors by which information may be processed. These information technology systems may be used to collect data for later retrieval, analysis and manipulation, which may be facilitated through a database program. These information technology systems provide interfaces that allow users to access and operate various system components.

In one embodiment, the mixing controller 601 may be connected to and/or communicate with entities such as, but not limited to: one or more users from user input devices 611; peripheral devices 612; an optional cryptographic process device 628; and/or a communications network 613.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The mixing controller 601 may be based on computer systems that may comprise, but are not limited to, components such as: a computer systemization 602 connected to memory 629.

Computer Systemization

A computer systemization 602 may comprise a clock 630, central processing unit ("CPU(s)" and/or "processor(s)" (these terms are used interchangeably throughout the disclosure unless noted to the contrary)) 603, a memory 629 (e.g., a read only memory (ROM) 606, a random access memory (RAM) 605, etc.), and/or an interface bus 607, and most frequently, although not necessarily, are all interconnected and/or communicating through a system bus 604 on one or more (mother)board(s) 602 having conductive and/or otherwise transportive circuit pathways through which instructions (e.g., binary encoded signals) may travel to effectuate communications, operations, storage, etc. The computer systemization may be connected to a power source 686; e.g., optionally the power source may be internal. Optionally, a cryptographic processor 626 and/or transceivers (e.g., ICs) 674 may be connected to the system bus. In another embodiment, the cryptographic processor and/or transceivers may be connected as either internal and/or external peripheral devices 612 via the interface bus I/O. In turn, the transceivers may be connected to antenna(s) 675, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, Global Positioning System (GPS) (thereby allowing mixing controller 601 to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to tire system bus and various clock multipliers that will increase or decrease the base operating frequency for other components interconnected in the computer systemization. The clock and various components in a computer systemization drive signals embodying information throughout the system. Such transmission and receipt of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to convention data processing techniques. Such instruction passing facilitates communication within the mixing controller and beyond through various interfaces. Should processing requirements dictate a greater amount of speed and/or capacity, distributed processors (e.g., a distributed mixing controller), mainframe, multi-core, parallel, and/or super-computer architectures may similarly be employed. Alternatively, should deployment requirements dictate greater portability, smaller Personal Digital Assistants (PDAs), laptop computing devices, or other portable devices configured in accordance with embodiments of the present disclosure may be employed.

Depending on the particular implementation, features of the mixing controller may be achieved by implementing a microcontroller such as CAST's R8051XC2 microcontroller; Intel's MCS 51 (i.e., 8051 microcontroller); and/or the like. Also, to implement certain features of the mixing controller, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the mixing controller component collection (distributed or otherwise) and/or features may be implemented via the microprocessor and/or via embedded components; e.g., via ASIC, coprocessor, DSP, FPGA, and/or the like. Alternately, some implementations of the mixing controller may be implemented with embedded components that are configured and used to achieve a variety of features or signal processing.

Depending on the particular implementation, the embedded components may include software solutions, hardware solutions, and/or some combination of both hardware/software solutions. For example, mixing controller features discussed herein may be achieved through implementing FPGAs, which are semiconductor devices containing programmable logic components called "logic blocks," and programmable interconnects, such as the high performance FPGA Virtex series and/or the low cost Spartan series manufactured by Xilinx. Logic blocks and interconnects can be programmed by the customer or designer, after the FPGA is manufactured, to implement any of the mixing controller features. A hierarchy of programmable interconnects allow logic blocks to be interconnected as needed by the mixing controller system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, tire logic blocks also include memory elements, which may be circuit flip-flops or more complete blocks of memory. In some circumstances, the mixing controller may be developed on regular FPGAs and then migrated into a fixed version that more resembles ASIC implementations. Alternate or coordinating implementations may migrate mixing controller features to a final ASIC instead of or in addition to FPGAs. Depending on the implementation, all of the aforementioned embedded components and microprocessors may be considered the "CPU" and/or "processor" for the mixing controller.

Power Source

The power source 686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the mixing controller thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(es) 607 may accept, connect, and/or communicate to a number of interface adapters, conventionally although not necessarily in the form of adapter cards, such as but not limited to: input output interfaces (I/O) 608, storage interfaces 609, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 609 may accept, communicate, and/or connect to a number of storage devices such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Through a communications network 613, the mixing controller is accessible through remote clients 633b (e.g., computers and other electronic devices capable of generating and/or communicating UGR content to the mixing controller via a local or network-based connection) by users 633a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount of speed and/or capacity, distributed network controllers (e.g., distributed mixing controller), architectures may similarly be employed to pool, load balance, and/or otherwise increase the communicative bandwidth required by the mixing controller. A communications network may be any one and/or the combination of the following: a direct interconnection, the Internet, a Local Area Network (LAN), a Metropolitan Area Network (MAN), an Operating Missions as Nodes on the Internet (OMNI), a secured custom connection, a Wide Area Network (WAN), a wireless network (e.g., employing protocols such as, but not limited to a Wireless Application Protocol (WAP), I-mode, and/or the like), and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 308 may accept, communicate, and/or connect to user input devices 611, peripheral devices 612, cryptographic processor devices 628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB), infrared, joystick, keyboard, midi, optical, PC AT, PS/2, parallel, radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth, cellular (e.g., code division multiple access (CDMA), high speed packet access (HSPA(+)), high speed downlink packet access (HSDPA), global system for mobile communications (GSM), long term evolution (LTE), WiMax, etc.), and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface. The video interface composites information is generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 611 often are a type of peripheral device 612 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 612 may be connected and/or communicate to I/O and/or other facilities of the like such as network interfaces, storage interfaces, directly to the interface bus, system bus, the CPU, and/or the like. Peripheral devices may be external, internal and/or part of the mixing controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 628), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the mixing controller may be embodied as an embedded, dedicated, and/or monitor-less (i.e., headless) devices, wherein access would be provided over a network interface connection.

Cryptographic units such as, but not limited to, microcontrollers, processors 626, interfaces 627, and/or devices 628 may be attached, and/or communicate with the mixing controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors, nCipher's nShield, SafeNet's Luna PCI (e.g., 7100) series, Semaphore Communications' 40 MHz Roadrunner 184, Sun's Cryptographic Accelerators (e.g., Accelerator 6000 PCIe Board, Accelerator 500 Daughtercard), Via Nano Processor (e.g., L2100, L2200, U2400) line, which is capable of performing 500+MB/s of cryptographic instructions; VLSI Technology's 33 MHz 6868, and/or the like.

Memory

Generally, any mechanization and/or embodiment allowing a processor to affect the storage and/or retrieval of information is regarded as memory 629. However, memory is a fungible technology and resource, thus, any number of memory embodiments may be employed in lieu of or in concert with one another. It is to be understood that the mixing controller and/or a computer systemization may employ various forms of memory 629. For example, a computer systemization may be configured where the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 629 will include ROM 606, RAM 605, and a storage device 614. A storage device 614 may be an conventional computer system storage. Storage devices may include a drum, a (fixed and/or removable) magnetic disk drive, a magneto-optical drive, an optical drive (i.e., Blu-ray, CD ROM/RAM/Recordable (R)/ReWritable (RW), DVD R/RW, HD DVD R/RW, etc.), an array of devices (e.g. Redundant Array of Independent Disks (RAID)), solid state memory devices (USB memory, solid state drives (SSD), etc.), other processor-readable storage mediums, and/or other devices of the like. Thus, a computer systemization generally requires and makes use of memory.

Component Collection

The memory 629 may contain a collection of program and/or database components and/or data such as, but not limited to: operating system component(s) 615 (operating system), information server components) (information server), user interface component(s) (user interface); Web browser component(s) (Web browser), UGR database(s) 619, pairing module 620, clustering module 622, synchronization module 624, normalization module 626, mixing module 628; the mixing component(s) 635, and/or the like (i.e., collectively a component collection). In aspects, the pairing module 620 may be configured to perform operations corresponding to the step 110 of FIG. 1 and/or steps 310 and 320 of FIG. 3, as described above; the clustering module 622 may be configured to perform operations corresponding to the step 120 of FIG. 1 and/or step 330 of FIG. 3, as described above; the synchronization module 624 may be configured to perform operations corresponding to the step 130 of FIG. 1 and step 330 (e.g., the synchronization portion) of FIG. 3, as described above; the normalization module 626 may be configured to perform operations corresponding to the step 140 of FIG. 1 and/or step 340 of FIG. 3, as described above; and the mixing module 628 may be configured to perform operations corresponding to the step 150 of FIG. 1 and/or the step 350 of FIG. 3, as described above. These components may be stored and accessed from the storage devices and/or from storage devices accessible through an interface bus. Although non-conventional program components such as those in the component collection, typically, are stored in a local storage device 614, they may also be loaded and/or stored in memory such as peripheral devices, RAM, remote storage facilities through a communications network, ROM, various forms of memory, and/or the like.

Operating System

The operating system component 615 is an executable program component facilitating the operation of the mixing controller. Typically, the operating system facilitates access of I/O, network interfaces, peripheral devices, storage devices, and/or the like. The operating system may be a highly fault tolerant, scalable, and secure system such as: Apple Macintosh OS X (Server), AT&T Plan 9, Be OS, Unix and Unix-like system distributions (such as AT&T's UNIX, Berkley Software Distribution (BSD) variations such as FreeBSD, NetBSD, OpenBSD, and/or the like, Linux distributions such as Red Hat, Ubuntu, and/or the like), and/or the like operating systems. However, more limited and/or less secure operating systems may also be employed such as Apple Macintosh OS, IBM OS/2, Microsoft DOS, Microsoft Windows 2000/2003/3.1/95/98/CE/Millennium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the mixing controller to communicate with other entities through a communications network 613. Various communication protocols may be used by the mixing controller as a subcarrier transport mechanism for interaction, such as, but not limited to: multicast, TCP/IP, UDP, unicast, and/or the like.

Information Server

An information server component 616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP), Hypertext Transfer Protocol (HTTP), Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahool Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the mixing controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself and/or facilities of the like. Most frequently, the information server communicates with the UGR database 619, operating systems, other program components, user interfaces, Web browsers, and/or the like.

Access to the UGR database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the mixing controller. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the mixing controller as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component may be a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 318 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both, lire combined application would similarly affect the obtaining and the provision of information to users, user agents, and/or the like from the mixing controller enabled nodes. The combined application may be nugatory on systems employing standard Web browsers.

The UGR Database

The UGR database component 619 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, the uniquely identify rows of a table on the "one" side of a one-to-many relationship.

Alternatively, the UGR database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the UGR database is implemented as a data-structure, the use of the UGR database 619 may be integrated into another component such as the mixing component 635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the UGR database component 619 includes UGR data 619a-n. In one embodiment, the UGR data 619a-n includes UGR content received from, obtained from, or generated by n users, and/or the like.

In one embodiment, the UGR database may interact with other database systems. For example, employing a distributed database system, queries and data access by search mixing component may treat the combination of the UGR database, an integrated data security layer database as a single database entity.

In one embodiment, user programs may contain various user interface primitives, which may serve to update the mixing controller. Also, various accounts may require custom database tables depending upon the environments and the types of clients the mixing controller may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 619a-n. The mixing controller may be configured to keep track of various settings, inputs, and parameters via database controllers.

The UGR database may communicate to and/or with other components in a component collection, including itself, and/or facilities of the like. Most frequently, the UGR database communicates with the mixing component, other program components, and/or the like. The database may contain, retain, and provide information regarding other nodes and data.

The Mixing Component

The mixing component 635 is a stored program component that is executed by a CPU. In one embodiment, the mixing component incorporates any and/or all combinations of the aspects of the mixing controller that were discussed in the previous figures. As such, the mixing controller affects accessing, obtaining and the provision of information, services, transactions, and/or the like across various communications networks. The features and embodiments of the mixing component discussed herein increase network efficiency by reducing data transfer requirements and use of more efficient data structures and mechanisms for their transfer and storage. As a consequence, more data may be transferred in less time, and latencies with regard to transactions are also reduced. In many cases, such reduction in storage, transfer time, bandwidth requirement, latencies, etc., will reduce the capacity and structural infrastructure requirements to support the mixing controller's features and facilities, and in many cases reduce the costs, energy consumption/requirements, and extend the life of mixing controller's underlying infrastructure; this has the added benefit of making the mixing controller more reliable. Similarly, many of the features and mechanisms are designed to be easier for users to use and access, thereby broadening the audience that may enjoy/employ and exploit the feature sets of the mixing controller; such ease of use also helps to increase the reliability of the mixing controller.

The mixing component enabling access of information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extension, web development environments and libraries (e.g., Microsoft's ActiveX, Adobe AIR, FLEX & FLASH, AJAX, (D)HTML, Dojo, Java, JavaScript, jQuery(UI), MooTools, Prototype, script.aculo.us, Simple Object Access Protocol (SOAP), SWFObject, Yahoo! User Interface, and/or the like), WebObjects, and/or the like. In one embodiment, the mixing controller server employs a cryptographic server to encrypt and decrypt communications. The mixing component may communicate to and/or with other components in a component collection, including itself, and/or facilities of the like. Most frequently, the mixing component communicates with the UGR database, operating systems, other program components, and/or the like. The mixing controller may contain, communicate, generate, obtain, and/or provide program component, system, user, and/or data communications, requests, and/or responses.

Distributed Mixing Controllers

The structure and/or operation of any of the mixing controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices, e.g., databases. All program component instances and controllers working in concert may do so through standard data processing communication techniques.

The configuration of the mixing controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage, (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g. communications) data. Further, the parsing grammar may be used beyond message parsing, but may also be used to parse: databases, data collections, data stores, structured data, and/or the like. Again, the desired configuration will depend upon the context, environment, and requirements of system deployment.

Referring to FIG. 7, a flow diagram of a method for mixing media content based on a plurality of UGRs in accordance with embodiments of the present disclosure is shown as a method 700. In an aspect, the steps of the method 700 may be performed by the system 600 of FIG. 6. For example, the method 700 may be stored as instructions (the instructions 630 of FIG. 6) that, when executed by one or more processors (e.g., the one or more processors 603 of FIG. 6), cause the one or more processors to perform operations for mixing media content based on a plurality of UGRs in accordance with the techniques described above with respect to FIGS. 1-5.

As shown in FIG. 7, the method 700 may include, at step 710, receiving a plurality of UGRs. Each UGR of the plurality of UGRs may include at least audio content. One or more of the UGRs may also include additional types of content, such as visual content (e.g., image content, video content, and the like). As described above, tire plurality of UGRs may be associated with audio content captured during an event, such as a concert, a sporting event, or other type of event. In an aspect, the plurality of UGRs may be received from one or more users. For example, the system 600 of FIG. 6 may be configured to receive UGRs from a plurality of users and to generate new audio content from the received UGRs using the method 700, as described in more detail below.

At step 720, the method 700 includes determining a correlation between samples of audio content associated with at least two UGRs of the plurality of UGRs. In an aspect, the step 720 may include operations similar to the step 110 of FIG. 1 and/or the steps 310 and 320 of FIG. 3. At step 730, the method 700 includes generating one or more clusters comprising samples of the audio content identified as having a relationship. The relationship between two or more samples of the audio content may be determined based on a correlation between the audio content of the at least two UGRs, which may be determined based on the clustering techniques described above with respect to FIGS. 1 and 3. Each of the one or more clusters may include a set of one or more UGRs, and each set of UGRs may be associated with a particular portion of the event, such as a certain time period during the event. It is noted that while UGRs within a set of UGRs may be associated with a particular portion of the event, this does not necessarily mean they represent identical portions of the event. To illustrate, assume a set of UGRs includes three UGRs associated with a particular portion of the event that spans a time period of 10 minutes. The first UGR may include audio content (and possibly other content, such as visual content) associated with the first 5 minutes of that 10 minute time period, the second UGR may include audio content (and possibly other content, such as visual content) covering the $3^{rd}$ through $7^{th}$ minutes of the 10 minute time period, and the third UGR may include audio content (and possibly other content, such as visual content) covering the $4^{th}$ through $10^{th}$ minutes of the 10 minute time period. Thus, these three UGRs may form a set of UGRs associated with a particular portion of the event (e.g., the portion of the event spanning the 10 minute time period). As explained above, these 3 UGRs may be found to have a relationship due to the overlap in their audio content. For example, the first and second UGRs overlap for the $3^{rd}$ through $5^{th}$ minutes of the 10 minute time period; the first and third UGRs overlap for the $4^{th}$ and $5^{th}$ minutes of the 10 minute time period; and the second and third UGRs overlap for the $4^{th}$ through $7^{th}$ minutes of the 10 minute time period. It is noted that the particular example described above has been provided for purposes of illustration, rather than by way of limitation. Thus, the particular portion of an event associated with a set of UGRs may be associated with longer or shorter periods of time and a sets of UGRs may include more than 3 UGRs or may include a single UGR.

In an aspect, the method 700 may include applying weights to relationships between two or more UGRs. The weights may be applied during generation of the one or more clusters. For example, as explained above, a relationship between two or more UGRs may be identified based on a correlation between the two or more UGRs, and the weights may indicate a strength of the relationship between the two or more UGRs.

At step 740, the method 700 includes synchronizing, for each of the one or more clusters, the samples of the audio content to produce synchronization data for each of the one or more clusters. As described above, the synchronization data may order the audio content for each of the clusters with respect to time. In an aspect, the synchronizing, at step 740, may include determining a reference UGR for each of the one or more clusters. As explained above, once the reference UGR is identified/determined/selected for a cluster of UGRs, the remaining UGRs associated with that cluster may be synchronized with respect to the reference UGR to produce the synchronization data for that cluster. In an aspect, the step 740 may generate the synchronization data in accordance with the synchronization techniques described above with reference to FIGS. 1 and 3.

At step 750, the method 700 includes normalizing media content based on the synchronization data derived from the audio content of the UGRs included in each of the one or more clusters to produce normalized media content. As explained above, different UGRs within a particular cluster may have different start and/or end points with respect to time. By normalizing the synchronized media content for each of the one or more clusters, at step 750, audible differences across transitions (e.g., start points and end points) between the UGRs of the clusters may be minimized, such that, after mixing, the perceptibility of a transition corresponding to a start and/or end of a particular UGR may be reduced and the mixed content may be more readily perceived as being generated from a single recording, as opposed to mixing many different UGRs together. In an aspect, the normalization may be performed iteratively until a stop criterion is satisfied. For example, the stop criterion may be associated with the stop criterion described above with respect to Eq. (39).

At step 760, the method 700 includes mixing media content associated with the plurality of UGRs based at least in part on the synchronization data. In an aspect, the media content that is mixed may comprise normalized media content, which may be generated at step 750. In an additional aspect, the media content that is mixed may comprise original media content (e.g., non-normalized media content). As described above with respect to FIGS. 1 and 3, the mixing may utilize segment-wise mixing techniques, target power mixing techniques, time-frequency domain mixing techniques, maximum component elimination mixing techniques, and/or segment-wise phase alignment mixing techniques. Additionally, it is noted that the synchronization data, which may be generated or derived based on the above-described techniques for processing audio content of the UGRs, may be utilized to synchronize non-audio content, such as video content of the UGRs—stated another way, UGR audio content may be processed using the various techniques described above to generate synchronization data, which may then be used to synchronize the UGR audio content; to synchronize UGR video content associated with the audio content; and/or to synchronize the UGR video content and audio content.

As shown above, the method 700 provides a new technological process for creating media content from UGRs. The new technological process provided by the method 700 enables a computing device, such as the system 600 of FIG. 6, to automatically create new media content (e.g., audio content, video content, audio/video content, and the like) from many individual recordings—even when the different individual recordings: span different moments in time (e.g., different portions of an event); have different durations; are captured from different locations or devices, which may impact the characteristics and/or quality of the individual recordings; and/or include different types of content (e.g., some recordings may include audio content and visual content, such as video content, while other recordings may only include audio content). Further, during generation of the new media content, the method 700 implements various operations to improve the overall quality of the new media content. For example, the operations of the method 700: identify relationships between different UGRs; group the UGRs based on identified relationships; synchronize UGRs within and across each UGR group; and/or mitigate audio imperfections associated with transitions between different UGRs. Thus, the method 700 improves the manner in which a computing device, such as the system 600 of FIG. 6, operates by enabling new media content to be automatically generated from a plurality of UGRs.

In order to address various issues and advance the art, the entirety of this application for AUDIO SAMPLE MIXING APPARATUSES, METHODS, AND SYSTEMS (including the Cover Page, Title, Headings, Field, Background, Summary, Brief Description of the Drawings, Detailed Description, Claims, Abstract, Figures, and otherwise) shows, by way of illustration, various embodiments in which the claimed innovations may be practiced. The advantages and features of the application are or a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed here. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organization, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed here other than it is as such for purposes of reducing space and repetition. For instance, it is to be understood that the logical and/or topological structure of any combination of any program components (a component collection), other components and/or any present features sets as described in the figures and/or throughout are not limited to a fixed operating order and/or arrangement, but rather, any disclosed order is exemplary and ail equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operations, organizational, structural, topological, and/or other aspects of the disclosure are not to be considered limitations on the disclosure as defined by the claims or limitations on equivalents to the claims. It is to be understood that, depending on the particular needs and/or characteristics of a mixing controller individual and/or enterprise user, database configuration and/or relational model, data type, data transmission and/or network framework, syntax structure, and/or the like, various embodiments of the mixing controller, may be implemented that enable a great deal of flexibility and customization.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for mixing audio content based on a plurality of user generated recordings (UGRs), the method comprising:
   receiving a plurality of UGRs, each UGR of the plurality of UGRs comprising at least audio content;
   determining a correlation between samples of audio content associated with at least two UGRs of the plurality of UGRs;
   generating one or more clusters based on the determined correlations, wherein each of the one or more clusters comprises at least one UGR;
   generating, for each of the one or more clusters, synchronization data based on the audio content and the determined correlations;
   normalizing the audio content associated with the UGRs to produce normalization data configured to modify signal levels of audio content within each of the one or more clusters, wherein the normalization data indicates a set of weights associated with the audio content associated with each of the one or more clusters; and
   mixing, for each of the one or more clusters, the audio content of the plurality of UGRs based at least in part on the synchronization data and the normalization data to produce mixed media content.

2. The method of claim 1, wherein the mixed media content comprises video content.

3. The method of claim 1, wherein the plurality of UGRs are associated with audio content from an event, wherein each of the one or more clusters comprises a set of UGRs, and wherein each set of UGRs is associated with a particular portion of the event.

4. The method of claim 3, further comprising calculating a cross-correlation between different pairs of UGRs, wherein UGRs are associated with particular portions of the event and associated with different clusters based at least in part on the cross-correlations.

5. The method of claim 4, further comprising applying weights during the generating of the one or more clusters, the weights indicating a strength of a relationship between a pair of UGRs of the plurality of UGRs, wherein relationship is indicated by a correlation determined with respect to the pair of UGRs.

6. The method of claim 1, wherein the synchronization data orders the media content for UGRs within each of the clusters with respect to time.

7. The method of claim 1, wherein the normalization is configured to minimize perceptible differences across transitions between UGRs, the transitions corresponding to a start point and an end point associated with a particular UGR, and wherein different UGRs within a particular cluster have different start and/or end points with respect to time.

8. The method of claim 1, wherein the mixing comprises a mixing technique selected from the list consisting of: a time-frequency domain mixing technique, a segment-wise mixing technique, a target power mixing technique, a maximum component elimination mixing technique, a minimum Variance Mixing (MVM) mixing technique, a segment-wise phase alignment mixing technique, and a maximum component elimination mixing technique.

9. The method of claim 1, further comprising generating a signal signature for each of the plurality of UGRs, wherein the correlation between the samples of the audio content is determined based at least in part on the signal signatures generated for each of the plurality of UGRs.

10. A method for mixing media content based on a plurality of user generated recordings (UGRs), the method comprising:
    receiving a plurality of UGRs, each UGR of the plurality of UGRs comprising at least audio content;
    generating a signal signature for each of the plurality of UGRs;
    determining similarities between at least two UGRs of the plurality of UGRs based at least in part on the signal signatures;
    estimating a time offset for each of the plurality of UGRs based at least in part on the signal signatures;
    normalizing the media content associated with the plurality of UGRs to produce normalization data configured to modify signal levels of audio content for each of the plurality of UGRs, wherein the normalization data indicates a set of weights associated with the audio content associated with the plurality of UGRs; and
    mixing the media content of the plurality of UGRs based at least in part on the time offsets and the normalization data to produce mixed media content.

11. The method of claim 10, further comprising:
    generating one or more clusters based on the similarities between the at least two one or more clusters comprises at least one UGR; and
    generating, for each of the one or more clusters, synchronization data based on the audio content, wherein the mixing of the media content is based on the synchronization data.

12. The method of claim 11, wherein the synchronization data orders the media content for UGRs within each of the clusters with respect to time.

13. The method of claim 11, wherein the mixed media content comprises video content.

14. The method of claim 10, wherein the mixing comprises a mixing technique selected from the list consisting of: a time-frequency domain mixing technique, a segment-wise mixing technique, a target power mixing technique, a maximum component elimination mixing technique, a minimum Variance Mixing (MVM) mixing technique, a segment-wise phase alignment mixing technique, and a maximum component elimination mixing technique.

15. The method of claim 14, wherein the normalization is configured to minimize perceptible differences across transitions between UGRs, the transitions corresponding to a start point and an end point associated with a particular UGR, and wherein different UGRs within a particular cluster have different start and/or end points with respect to time.

16. A non-transitory computer-readable storage medium storing instructions that, when executed by one or more processors, cause the one or more processors to perform operations for mixing media content based on a plurality of user generated recordings (UGRs), the operations comprising:

receiving a plurality of UGRs, each UGR of the plurality of UGRs comprising at least audio content;

generating a signal signature for each of the plurality of UGRs;

determining similarities between at least two UGRs of the plurality of UGRs based at least in part on the signal signatures;

estimating a time offset for each of the plurality of UGRs based at least in part on the signal signatures;

normalizing the media content associated with the plurality of UGRs to produce normalization data configured to modify signal levels of audio content for each of the plurality of UGRs, wherein the normalization data indicates a set of weights associated with the audio content associated with the plurality of UGRs; and mixing the media content of the plurality of UGRs based at least in part on the time offsets and the normalization data to produce mixed media content.

17. The non-transitory computer-readable storage medium of claim 16, the operations further comprising:

generating one or more clusters based on the similarities between the at least two one or more clusters comprises at least one UGR; and generating, for each of the one or more clusters, synchronization data based on the audio content, wherein the mixing of the media content is based on the synchronization data.

18. The non-transitory computer-readable storage medium of claim 17, wherein the synchronization data orders the media content for UGRs within each of the clusters with respect to time.

19. The non-transitory computer-readable storage medium of claim 16, wherein the mixed media content comprises video content.

* * * * *